(12) United States Patent
Jiang et al.

(10) Patent No.: US 11,158,287 B2
(45) Date of Patent: Oct. 26, 2021

(54) METHODS AND SYSTEMS FOR COMPRESSING AND DECOMPRESSING DISPLAY DEMURA COMPENSATION DATA

(71) Applicant: Shenzhen Yunyinggu Technology Co., Ltd., Shenzhen (CN)

(72) Inventors: Yongwen Jiang, Shenzhen (CN); Haining Xu, Shenzhen (CN); Jingfeng Wang, Shenzhen (CN); Mengya Shen, Shenzhen (CN); Yajun Cao, Shenzhen (CN); Haopeng Lian, Taoyuan Road (CN); Zhenqiang Ma, Shenzhen (CN)

(73) Assignee: SHENZHEN YUNYINGGU TECHNOLOGY CO., LTD., Shenzhen (CN)

( * ) Notice: Subject to any disclaimer, the term of this patent is extended or adjusted under 35 U.S.C. 154(b) by 56 days.

(21) Appl. No.: 16/886,608

(22) Filed: May 28, 2020

(65) Prior Publication Data
US 2021/0287624 A1    Sep. 16, 2021

Related U.S. Application Data

(63) Continuation of application No. PCT/CN2020/078734, filed on Mar. 11, 2020.

(51) Int. Cl.
*G09G 5/10* (2006.01)
*G06T 1/20* (2006.01)

(52) U.S. Cl.
CPC ............ *G09G 5/10* (2013.01); *G06T 1/20* (2013.01); *G09G 2320/0233* (2013.01)

(58) Field of Classification Search
CPC ..... G09G 5/10; G09G 2320/0233; G06T 1/20
(Continued)

(56) References Cited

U.S. PATENT DOCUMENTS

2009/0290040 A1    11/2009  Du et al.
2015/0279325 A1*   10/2015  Lu .......................... G09G 5/18
                                                            345/690
2015/0348458 A1    12/2015  Tian et al.

FOREIGN PATENT DOCUMENTS

CN    109887456 A  *  6/2019
CN    109887456 A     6/2019
(Continued)

OTHER PUBLICATIONS

International Search Report issued in corresponding International Application No. PCT/2020/078734, dated Dec. 11, 2020, 5 pages.
(Continued)

*Primary Examiner* — Jennifer Mehmood
*Assistant Examiner* — Kim Thanh T Tran
(74) *Attorney, Agent, or Firm* — Bayes PLLC

(57) ABSTRACT

Embodiments of the present disclosure provide a system for display. The system includes a display having a plurality of pixels, a processor, and a control logic. The processor includes a graphics pipeline configured to generate a plurality of pieces of pixel data for the plurality of pixels and a pre-processing module configured to generate a plurality of pieces of compensation data for the pixel data and compress the compensation data. The compensation data is compressed by determining a plurality of pieces of quantified down-sampled compensation data based on the compensation data, converting the quantified down-sampled compensation data into M units of index data, and converting the M units of index data into M code streams. The control logic is operatively coupled to the display and the processor and includes a post-processing module configured to decompress the compressed compensation data based on the M code streams to provide control signals.

20 Claims, 23 Drawing Sheets

(58) Field of Classification Search
USPC .......................................................... 345/506
See application file for complete search history.

(56) References Cited

FOREIGN PATENT DOCUMENTS

| | | |
|---|---|---|
| CN | 109889846 A | 6/2019 |
| CN | 110321915 A | 10/2019 |

OTHER PUBLICATIONS

Written Opinion of the International Searching Authority issued in corresponding International Application No. PCT/2020/078734, dated Dec. 11, 2020, 5 pages.

* cited by examiner

| QDSCD11 | QDSCD12 | QDSCD13 | ... |
| QDSCD21 | QDSCD22 | QDSCD23 | ... |
| QDSCD31 | QDSCD32 | QDSCD33 | ... |
| QDSCD41 | QDSCD42 | QDSCD43 | ... |
| ... | ... | ... | ... |

514

| I0 | QDSCD0 | num0 |
| I1 | QDSCD1 | num1 |
| I2 | QDSCD2 | num2 |
| I3 | QDSCD3 | num3 |
| I4 | QDSCD4 | num4 |
| I5 | QDSCD5 | num5 |
| I6 | QDSCD6 | num6 |
| ... | ... | ... |

FIG. 5F

| BASE LOOKUP TABLE | INITIAL SUB LOOKUP TABLES | | | |
|---|---|---|---|---|
| | | INDEX 0 | SIZE 0 | CODE STREAM 0 |
| | | INDEX 1 | SIZE 1 | CODE STREAM 1 |
| | | INDEX 2 | SIZE 2 | CODE STREAM 2 |
| | | ... | ... | ... |

UNIT 0
UNIT 1
UNIT 2
...

FIG. 5K

METHODS AND SYSTEMS FOR COMPRESSING AND DECOMPRESSING DISPLAY DEMURA COMPENSATION DATA

CROSS-REFERENCE TO RELATED APPLICATIONS

This application is continuation of International Application No. PCT/CN2020/078734, filed on Mar. 11, 2020, entitled "METHODS AND SYSTEMS FOR COMPRESSING AND DECOMPRESSING DISPLAY DEMURA COMPENSATION DATA," which is hereby incorporated by reference in its entirety.

BACKGROUND

The disclosure relates generally to display technologies, and more particularly, to display data processing.

In display technology, "mura" refers to brightness irregularities in a display panel, causing degradation of display quality. "Demura" refers to the process that compensates the mura. Based on the physical properties of the display panel, compensation data is generated for compensating the pixel data for display on the display panel. The compensation data is often arranged as a lookup table, which is stored in a memory, e.g., a flash memory. The compensation data is often first compressed and then decompressed during the display process to reduce the storage space in the memory.

SUMMARY

The disclosure relates generally to display technologies, and more particularly, to compression and decompression of demura compensation data.

In one example, a system for display includes a display having a plurality of pixels, a processor, and a control logic operatively coupled to the display and the processor. The processor includes a graphics pipeline configured to generate a plurality of pieces of pixel data for the plurality of pixels and a pre-processing module configured to generate a plurality of pieces of compensation data for the pixel data and compress the compensation data. The compression of the compensation data includes the following operations. First, a plurality of pieces of quantified down-sampled compensation data is determined based on the compensation data. A size of the quantified down-sampled compensation data is less than a size of the compensation data. The quantified down-sampled compensation data is converted into M units of index data. M is a positive integer greater than 1 and less than the size of the quantified down-sampled compensation data. The M units of index data is converted into M code streams. The control logic includes a post-processing module configured to decompress the compressed compensation data based on the M code streams to provide control signals for driving the display.

In another example, a method for compressing and decompressing compensation data for a display is provided. The method includes the following operations. First, a plurality of pieces of compensation data for pixel data of the display is generated. The compensation data can be compressed by the following operations. A plurality of pieces of quantified down-sampled compensation data is determined based on the compensation data, a size of the quantified down-sampled compensation data being less than a size of the compensation data. The quantified down-sampled compensation data is converted into M units of index data, M being a positive integer greater than 1 and less than the size of the quantified down-sampled compensation data. The M units of index data is converted into M code streams. The compensation data is decompressed based on the M code streams to provide control signals for driving the display.

In still another example, a non-transitory computer-readable medium that stores a set of instructions, when executed by at least one processor, causes the at least one processor to determine a method for compressing and decompressing compensation data for a display. The method includes the following operations. First, a plurality of pieces of compensation data for pixel data of the display is generated. The compensation data can be compressed by the following operations. A plurality of pieces of quantified down-sampled compensation data is determined based on the compensation data, a size of the quantified down-sampled compensation data being less than a size of the compensation data. The quantified down-sampled compensation data is converted into M units of index data, M being a positive integer greater than 1 and less than the size of the quantified down-sampled compensation data. The M units of index data is converted into M code streams. The compensation data is decompressed based on the M code streams to provide control signals for driving the display.

BRIEF DESCRIPTION OF THE DRAWINGS

The embodiments will be more readily understood in view of the following description when accompanied by the below figures and wherein like reference numerals represent like elements, wherein:

FIG. 5F depicts a plurality of pieces of quantified down-sampled compensation data an exemplary order in accordance with an embodiment;

FIG. 5K depicts an exemplary data structure of the compressed compensation data in accordance with an embodiment;

DETAILED DESCRIPTION

Figure 1:
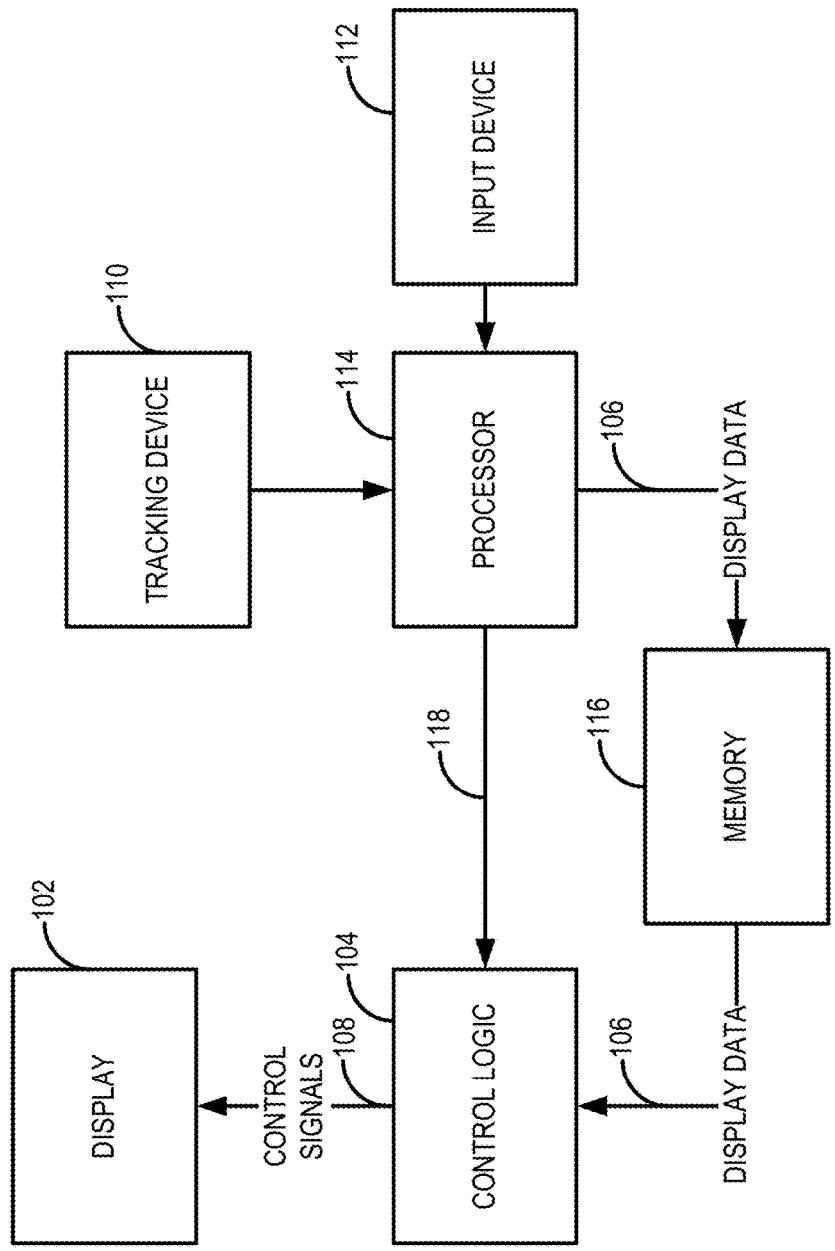
FIG. 1 is a block diagram illustrating an apparatus including a display and control logic in accordance with an embodiment.

In the following detailed description, numerous specific details are set forth by way of examples in order to provide a thorough understanding of the relevant disclosures. However, it should be apparent to those skilled in the art that the present disclosure may be practiced without such details. In other instances, well known methods, procedures, systems, components, and/or circuitry have been described at a relatively high-level, without detail, in order to avoid unnecessarily obscuring aspects of the present disclosure.

Throughout the specification and claims, terms may have nuanced meanings suggested or implied in context beyond an explicitly stated meaning. Likewise, the phrase "in one embodiment/example" as used herein does not necessarily refer to the same embodiment and the phrase "in another embodiment/example" as used herein does not necessarily refer to a different embodiment. It is intended, for example, that claimed subject matter include combinations of example embodiments in whole or in part.

In general, terminology may be understood at least in part from usage in context. For example, terms, such as "and", "or", or "and/or," as used herein may include a variety of meanings that may depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context. For ease of description, in the present disclosure, "demura compensation data" and "compensation data" are interchangeable.

As will be disclosed in detail below, among other novel features, the display system, apparatus, and method disclosed herein can effectively reduce the size of compensation data used for compensating display nonuniformities (e.g., "mura" caused by, e.g., fabrication nonuniformities) of a display panel. The compensation data can be compressed with improved efficiency and higher accuracy. Less storage space is used for storing the compressed compensation data in a memory (e.g., a flash memory). Bandwidth used for transmitting the compressed compensation data, using the data compression methods of the present disclosure, can be reduced compared to conventional methods.

According to the embodiments of the present disclosure, the compensation data undergoes a plurality of compression operations, significantly reducing the size of the compensation data. At the beginning of the process, the compensation data is down-sampled, e.g., by a factor greater than 1, reducing the size of the compensation data. The down-sampled compensation data is then quantified so that at least two pieces of down-sampled compensation data are quantified to have the same quantified value, further reducing the size of the compensation data. The quantified down-sampled compensation data is further converted to index data, which includes only non-negative integers and spanning in a smaller range than the quantified down-sampled compensation data. Because the quantified down-sampled compensation data often includes both negative and positive values and has a relatively arbitrary distribution, the conversion from the quantified down-sampled compensation data to index data can further reduce the size of the compensation data. The index data is then divided into M units and converted to M code streams of binary codes (e.g., bits), further reducing quantified down-sampled compensation data. In some embodiments, the down-sampling and the quantification operations are lossy data compression. In some embodiments, the conversion from quantified down-sampled compensation data to index data and the conversion from index data to code streams include lossless data compression. The compressed compensation data, including the code streams and other data for decompressing the compressed compensation data, can be stored in flash memory. In some embodiments, the compression of the compensation data, i.e., the down-sampling, the quantification, and the conversions, is performed by a processor (or an application processor (AP)).

The stored compressed compensation data can be accessed and decompressed to form decompressed compensation data. The M code streams are first converted into corresponding index data. The index data is then converted to corresponding quantified down-sampled compensation data. Because the conversions employed in the data compression are lossless data compression, the quantified down-sampled compensation data formed in the decompression operation is identical to the quantified down-sampled compensation data prior to conversions in the compression operation. In some embodiments, the conversions in the decompression operation are respective inverse operations of the conversions in the compression operation. The quantified down-sampled compensation data is further up-sampled, by the same factor for down-sampling, to form the decompressed compensation data, which has the same size as the compensation data (or the original compensation data before compression and decompression operations). In some embodiments, the decompression of the compressed compensation data, i.e., the conversions and the up-sampling, is performed by a control logic (or a display driver integrated circuit (DDIC)).

Additional novel features will be set forth in part in the description which follows, and in part will become apparent to those skilled in the art upon examination of the following and the accompanying drawings or may be learned by production or operation of the examples. The novel features of the present disclosure may be realized and attained by practice or use of various aspects of the methodologies, instrumentalities, and combinations set forth in the detailed examples discussed below.

For ease of description, as used herein, "a piece of data" or the like refers to a set of data (e.g., compensation data or display data) that can include one or more values. In the present disclosure, for example, "a piece of compensation data" refers to any number of values used for compensating one pixel. The piece of compensation data may include at least one value each for compensating a subpixel. When a piece of data includes a single value, the "piece of data" and "value" are interchangeable. For example, when a piece of compensation data includes only one value, the piece of compensation data can also be referred to as the compensation value, or the like. The specific number of values included in a piece of data should not be limited.

FIG. 1 illustrates an apparatus 100 including a display 102 and control logic 104. Apparatus 100 may be any suitable device, for example, a VR/AR device (e.g., VR headset, etc.), handheld device (e.g., dumb or smart phone, tablet, etc.), wearable device (e.g., eyeglasses, wrist watch, etc.), automobile control station, gaming console, television set, laptop computer, desktop computer, netbook computer, media center, set-top box, global positioning system (GPS), electronic billboard, electronic sign, printer, or any other suitable device. In this embodiment, display 102 is operatively coupled to control logic 104 and is part of apparatus 100, such as but not limited to, a head-mounted display, computer monitor, television screen, dashboard, electronic billboard, or electronic sign. Display 102 may be an OLED display, liquid crystal display (LCD), E-ink display, electroluminescent display (ELD), billboard display with LED or incandescent lamps, or any other suitable type of display.

Control logic 104 may be any suitable hardware, software, firmware, or a combination thereof, configured to receive display data 106 (e.g., pixel data and compensation data) and generate control signals 108 for driving the subpixels on display 102. Control signals 108 are used for controlling the writing of display data to the subpixels and directing operations of display 102. For example, subpixel rendering algorithms for various subpixel arrangements may be part of control logic 104 or implemented by control logic 104. Control logic 104 may include any other suitable components, such as an encoder, a decoder, one or more processors, controllers, and storage devices. Control logic 104 may be implemented as a standalone integrated circuit (IC) chip, such as an application-specific integrated circuit (ASIC) or a field-programmable gate array (FPGA). Apparatus 100 may also include any other suitable component such as, but not limited to tracking devices 110 (e.g., inertial sensors, camera, eye tracker, GPS, or any other suitable devices for tracking motion of eyeballs, facial expression, head motion, body motion, and hand gesture) and input devices 112 (e.g., a mouse, keyboard, remote controller, handwriting device, microphone, scanner, etc.).

In this embodiment, apparatus 100 may be a handheld or a VR/AR device, such as a smart phone, a tablet, or a VR headset. Apparatus 100 may also include a processor 114 and memory 116. Processor 114 may be, for example, a graphics processor (e.g., graphics processing unit (GPU)), an application processor (AP), a general processor (e.g., APU, accelerated processing unit; GPGPU, general-purpose computing on GPU), or any other suitable processor. Memory 116 may be, for example, a discrete frame buffer or a unified memory. Processor 114 is configured to generate display data 106 in display frames and may temporally store display data 106 in memory 116 before sending it to control logic 104. Processor 114 may also generate other data, such as but not limited to, control instructions 118 or test signals, and provide them to control logic 104 directly or through memory 116. Control logic 104 then receives display data 106 from memory 116 or from processor 114 directly. In some embodiments, no control instructions 118 is directly transmitted from processor 114 to control logic 104. In some embodiments, compensation data transmitted from processor 114 to memory 116 and/or from memory 116 to control logic 104 may be compressed.

In some embodiments, control logic 104 is part of apparatus 100, processor 114 is part of an external device of apparatus 100, and memory 116 is an external storage device that is used to store data computed by processor 114. The data stored in processor 114 may be inputted into control logic 104 for further processing. In some embodiments, no control instructions 118 is transmitted from processor 114 to control logic 104. For example, apparatus 100 may be a smart phone or tablet, and control logic 104 may be part of apparatus 100. Processor 114 may be part of an external computer that is different from apparatus 100/control logic 104. Display data 106 may include any suitable data computed by and transmitted from processor 114 to control logic 104. For example, display data may include compressed compensation data. In some embodiments, display data 106 includes no pixel data. Memory 116 may include a flash drive that stores the compressed compensation data processed by processor 114. Memory 116 may be coupled to control logic 104 to input the compressed compensation data into apparatus 100 such that control logic 104 can decompress the compressed compensation data and generate corresponding control signals 108 for display 102.

Figure 2A:
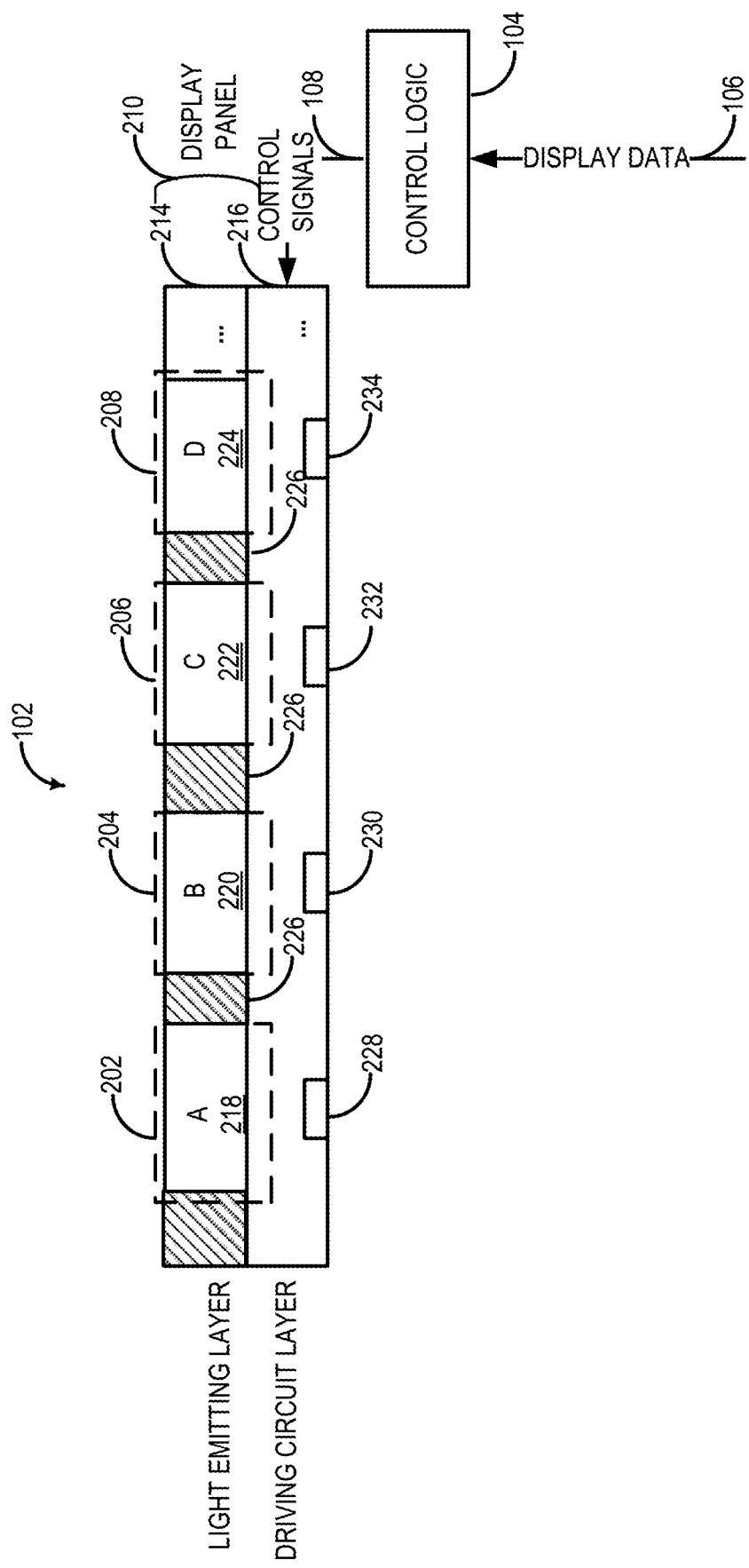
FIGS. 2A-2C are side-view diagrams illustrating various examples of the display shown in FIG. 1 in accordance with various embodiments.

FIG. 2A is a side-view diagram illustrating one example of display 102 including subpixels 202, 204, 206, and 208. Display 102 may be any suitable type of display, for example, OLED displays, such as an active-matrix OLED (AMOLED) display, or any other suitable display. Display 102 may include a display panel 210 operatively coupled to control logic 104. The example shown in FIG. 2A illustrates a side-by-side (a.k.a. lateral emitter) OLED color patterning architecture in which one color of light-emitting material is deposited through a metal shadow mask while the other color areas are blocked by the mask.

In this embodiment, display panel 210 includes a light emitting layer 214 and a driving circuit layer 216. As shown in FIG. 2A, light emitting layer 214 includes a plurality of light emitting elements (e.g., OLEDs) 218, 220, 222, and 224, corresponding to a plurality of subpixels 202, 204, 206, and 208, respectively. A, B, C, and D in FIG. 2A denote OLEDs in different colors, such as but not limited to, red, green, blue, yellow, cyan, magenta, or white. Light emitting layer 214 also includes a black array 226 disposed between OLEDs 218, 220, 222, and 224, as shown in FIG. 2A. Black array 226, as the borders of subpixels 202, 204, 206, and 208, is used for blocking lights coming out from the parts outside OLEDs 218, 220, 222, and 224. Each OLED 218, 220, 222, and 224 in light emitting layer 214 can emit a light in a predetermined color and brightness.

In this embodiment, driving circuit layer 216 includes a plurality of pixel circuits 228, 230, 232, and 234, each of which includes one or more thin film transistors (TFTs), corresponding to OLEDs 218, 220, 222, and 224 of subpixels 202, 204, 206, and 208, respectively. Pixel circuits 228, 230, 232, and 234 may be individually addressed by control signals 108 from control logic 104 and configured to drive corresponding subpixels 202, 204, 206, and 208, by controlling the light emitting from respective OLEDs 218, 220, 222, and 224, according to control signals 108. Driving circuit layer 216 may further include one or more drivers (not shown) formed on the same substrate as pixel circuits 228, 230, 232, and 234. The on-panel drivers may include circuits for controlling light emitting, gate scanning, and data writing as described below in detail. Scan lines and data lines are also formed in driving circuit layer 216 for transmitting scan signals and data signals, respectively, from the drivers to each pixel circuit 228, 230, 232, and 234. Display panel 210 may include any other suitable component, such as one or more glass substrates, polarization layers, or a touch panel (not shown). Pixel circuits 228, 230, 232, and 234 and other components in driving circuit layer 216 in this embodiment are formed on a low temperature polycrystalline silicon (LTPS) layer deposited on a glass substrate, and the TFTs in each pixel circuit 228, 230, 232, and 234 are p-type transistors (e.g., PMOS LTPS-TFTs). In some embodiments, the components in driving circuit layer 216 may be formed on an amorphous silicon (a-Si) layer, and the TFTs in each pixel circuit may be n-type transistors (e.g., NMOS TFTs). In some embodiments, the TFTs in each pixel circuit may be organic TFTs (OTFT) or indium gallium zinc oxide (IGZO) TFTs.

As shown in FIG. 2A, each subpixel 202, 204, 206, and 208 is formed by at least an OLED 218, 220, 222, and 224 driven by a corresponding pixel circuit 228, 230, 232, and 234. Each OLED may be formed by a sandwich structure of an anode, an organic light-emitting layer, and a cathode. Depending on the characteristics (e.g., material, structure, etc.) of the organic light-emitting layer of the respective OLED, a subpixel may present a distinct color and brightness. Each OLED 218, 220, 222, and 224 in this embodiment is a top-emitting OLED. In some embodiments, the OLED may be in a different configuration, such as a bottom-emitting OLED. In one example, one pixel may consist of three adjacent subpixels, such as subpixels in the three primary colors (red, green, and blue) to present a full color. In another example, one pixel may consist of four adjacent subpixels, such as subpixels in the three primary colors (red, green, and blue) and the white color. In still another example, one pixel may consist of two adjacent subpixels. For example, subpixels A 202 and B 204 may constitute one pixel, and subpixels C 206 and D 208 may constitute another pixel. Here, since the display data 106 is usually programmed at the pixel level, the two subpixels of each pixel or the multiple subpixels of several adjacent pixels may be addressed collectively by subpixel rendering to present the appropriate brightness and color of each pixel, as designated in display data 106 (e.g., pixel data). However, it is to be appreciated that, in some embodiments, display data 106 may be programmed at the subpixel level such that display data 106 can directly address individual subpixel without subpixel rendering. Because it usually requires three primary colors (red, green, and blue) to present a full color, specifically designed subpixel arrangements may be provided for display 102 in conjunction with subpixel rendering algorithms to achieve an appropriate apparent color resolution. In some embodiments, the resolution of each of red, green, and blue colors is equal to one another. In other embodiments, the resolution of red, green, and blue colors may not all be the same.

Figure 2B:
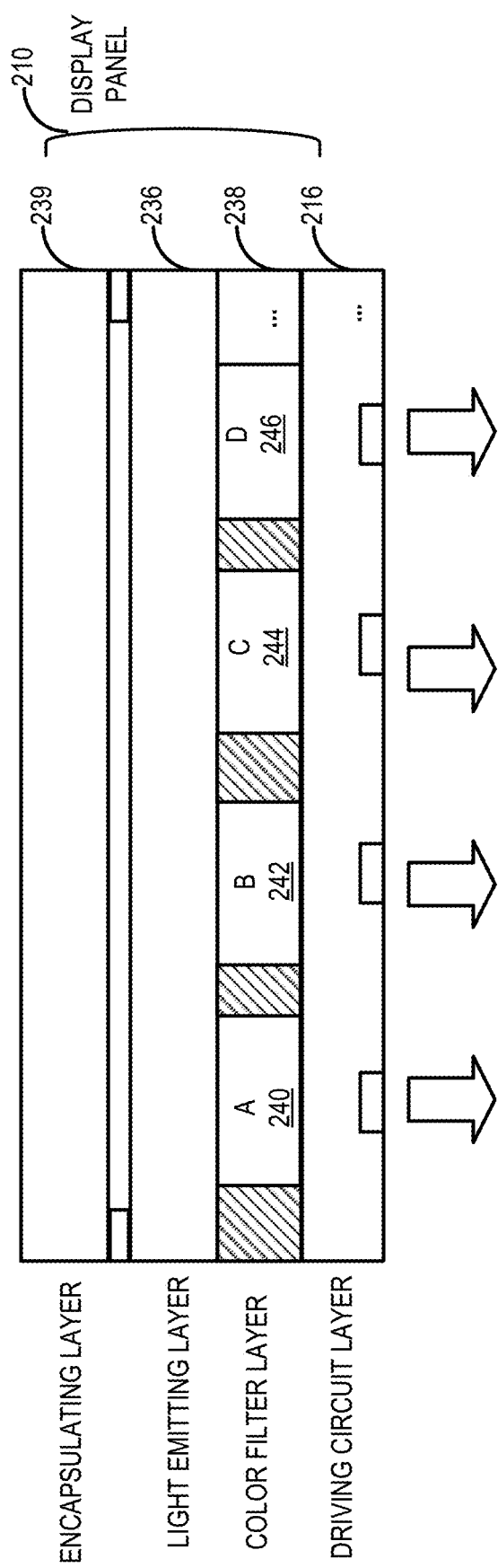

The example shown in FIG. 2A illustrates a side-by-side patterning architecture in which one color of light-emitting material is deposited through the metal shadow mask while the other color areas are blocked by the mask. In another example, a white OLEDs with color filters (WOLED+CF) patterning architecture can be applied to display panel 210. In the WOLED+CF architecture, a stack of light-emitting materials form a light emitting layer of the white light. The color of each individual subpixel is defined by another layer of color filters in different colors. As the organic light-emitting materials do not need to be patterned through the metal shadow mask, the resolution and display size can be increased by the WOLED+CF patterning architecture. FIG. 2B illustrates an example of a WOLED+CF patterning architecture applied to display panel 210. Display panel 210 in this embodiment includes driving circuit layer 216, a light emitting layer 236, a color filter layer 238, and an encapsulating layer 239. In this example, light emitting layer 236 includes a stack of light emitting sub-layers and emits the white light. Color filter layer 238 may be comprised of a color filter array having a plurality of color filters 240, 242, 244, and 246 corresponding to subpixels 202, 204, 206, and 208, respectively. A, B, C, and D in FIG. 2B denote four different colors of filters, such as but not limited to, red, green, blue, yellow, cyan, magenta, or white. Color filters 240, 242, 244, and 246 may be formed of a resin film in which dyes or pigments having the desired color are contained. Depending on the characteristics (e.g., color, thickness, etc.) of the respective color filter, a subpixel may present a distinct color and brightness. Encapsulating layer 239 may include an encapsulating glass substrate or a substrate fabricated by the thin film encapsulation (TFE) technology. Driving circuit layer 216 may be comprised of an array of pixel circuits including LTPS, IGZO, or OTFT transistors. Display panel 210 may include any other suitable components, such as polarization layers, or a touch panel (not shown).

Figure 2C:
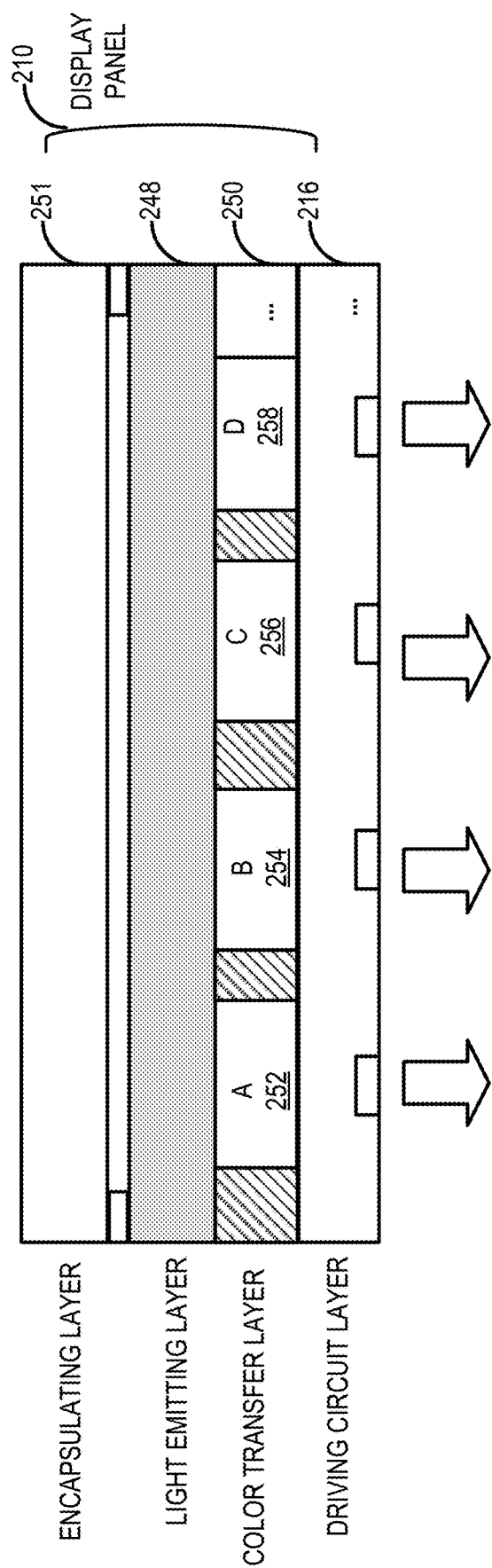

In still another example, a blue OLEDs with transfer color filters (BOLED+transfer CF) patterning architecture can be applied to display panel 210 as well. In the BOLED+transfer CF architecture, a light-emitting material of blue light is deposited without a metal shadow mask, and the color of each individual subpixel is defined by another layer of transfer color filters for different colors. FIG. 2C illustrates an example of a BOLED+transfer CF patterning architecture applied to display panel 210. Display panel 210 in this embodiment includes driving circuit layer 216, a light emitting layer 248, a color transfer layer 250, and an encapsulating layer 251. Light emitting layer 248 in this embodiment emits the blue light and can be deposited without a metal shadow mask. It is to be appreciated that in some embodiments, light emitting layer 248 may emit other colors of light. Color transfer layer 250 may be comprised of a transfer color filters array having a plurality of transfer color filters 252, 254, 256, and 258 corresponding to subpixels 202, 204, 206, and 208, respectively. A, B, C, and D in FIG. 2C denote four different colors of transfer color filters, such as but not limited to, red, green, blue, yellow, cyan, magenta, or white. Each type of transfer color filter may be formed of a color changing material. Depending on the characteristics (e.g., color, thickness, etc.) of the respective transfer color filter, a subpixel may present a distinct color and brightness. Encapsulating layer 251 may include an encapsulating glass substrate or a substrate fabricated by the TFE technology. Driving circuit layer 216 may be comprised of an array of pixel circuits including LTPS, IGZO, or OTFT transistors. Display panel 210 may include any other suitable component, such as polarization layers, or a touch panel (not shown).

The disclosed compressing and decompressing methods are suitable for any known OLED patterning architectures, including but not limited to, the side-by-side, WOLED+CF, and BOLED+CCM patterning architectures as described above. Although FIGS. 2A-2C are illustrated as an OLED display, it is to be appreciated that they are provided for an exemplary purpose only and without limitations. The methods disclosed herein may be applied to any suitable display as described above.

Figure 3:
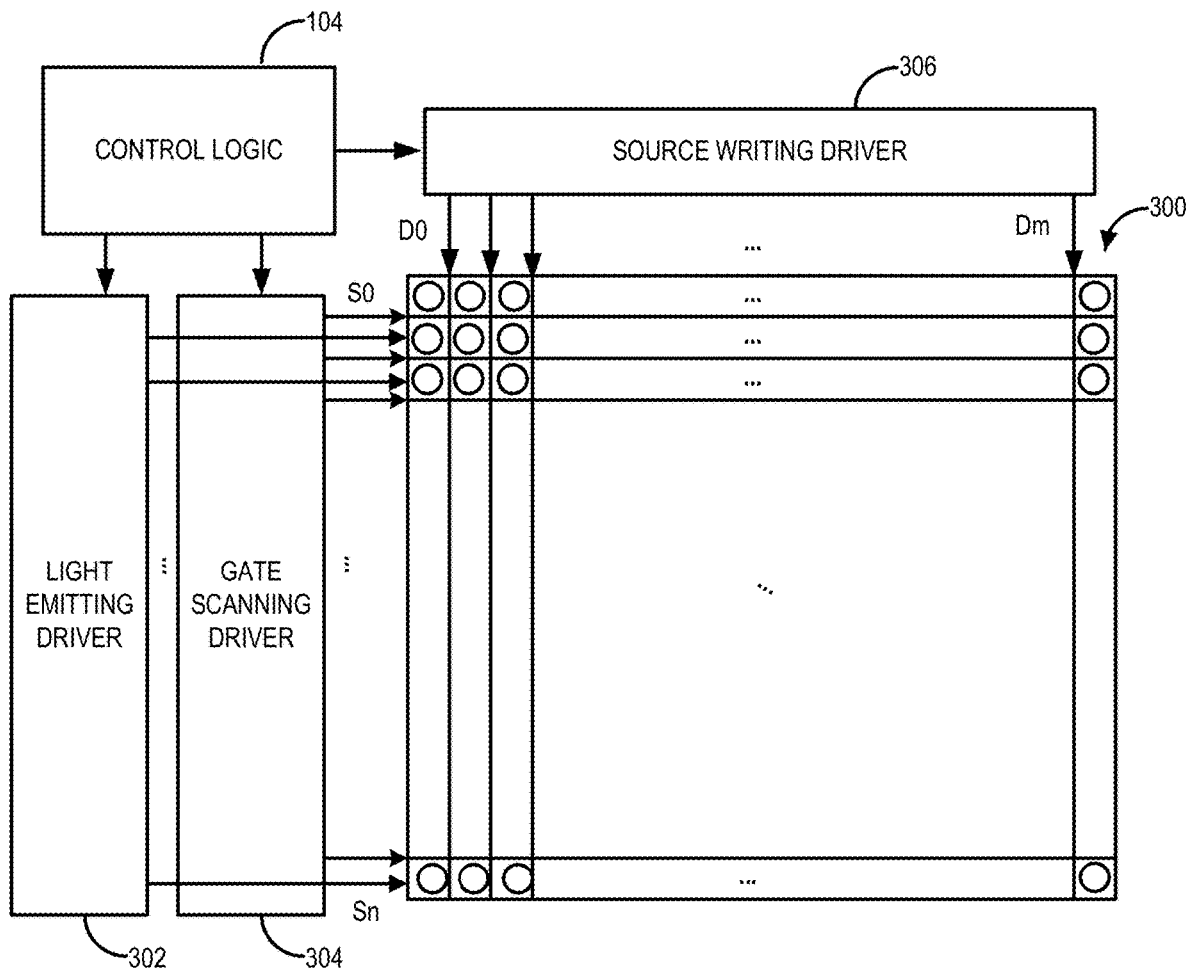
FIG. 3 is a plan-view diagram illustrating the display shown in FIG. 1 including multiple drivers in accordance with an embodiment.

FIG. 3 is a plan-view diagram illustrating display 102 shown in FIG. 1 including multiple drivers in accordance with an embodiment. Display panel 210 in this embodiment includes an array of subpixels 300 (e.g., OLEDs), a plurality of pixel circuits (not shown), and multiple on-panel drivers including a light emitting driver 302, a gate scanning driver 304, and a source writing driver 306. The pixel circuits are operatively coupled to array of subpixels 300 and on-panel drivers 302, 304, and 306. Light emitting driver 302 in this embodiment is configured to cause array of subpixels 300 to emit lights in each frame. It is to be appreciated that although one light emitting driver 302 is illustrated in FIG. 3, in some embodiments, multiple light emitting drivers may work in conjunction with each other.

Gate scanning driver 304 in this embodiment applies a plurality of scan signals S0-Sn, which are generated based on control signals 108 from control logic 104, to the scan lines (a.k.a. gate lines) for each row of subpixels in array of subpixels 300 in a sequence. The scan signals S0-Sn are applied to the gate electrode of a switching transistor of each pixel circuit during the scan/charging period to turn on the switching transistor so that the data signal for the corresponding subpixel can be written by source writing driver 306. As will be described below in detail, the sequence of applying the scan signals to each row of array of subpixels 300 (i.e., the gate scanning order) may vary in different embodiments. In some embodiments, not all the rows of subpixels are scanned in each frame. It is to be appreciated that although one gate scanning driver 304 is illustrated in FIG. 3, in some embodiments, multiple gate scanning drivers may work in conjunction with each other to scan array of subpixels 300.

Source writing driver 306 in this embodiment is configured to write display data received from control logic 104 into array of subpixels 300 in each frame. For example, source writing driver 306 may simultaneously apply data signals D0-Dm to the data lines (a.k.a. source lines) for each column of subpixels. That is, source writing driver 306 may include one or more shift registers, digital-analog converter (DAC), multiplexers (MUX), and arithmetic circuit for controlling a timing of application of voltage to the source electrode of the switching transistor of each pixel circuit (i.e., during the scan/charging period in each frame) and a magnitude of the applied voltage according to gradations of display data 106. It is to be appreciated that although one source writing driver 306 is illustrated in FIG. 3, in some embodiments, multiple source writing drivers may work in conjunction with each other to apply the data signals to the data lines for each column of subpixels.

Figure 4A:
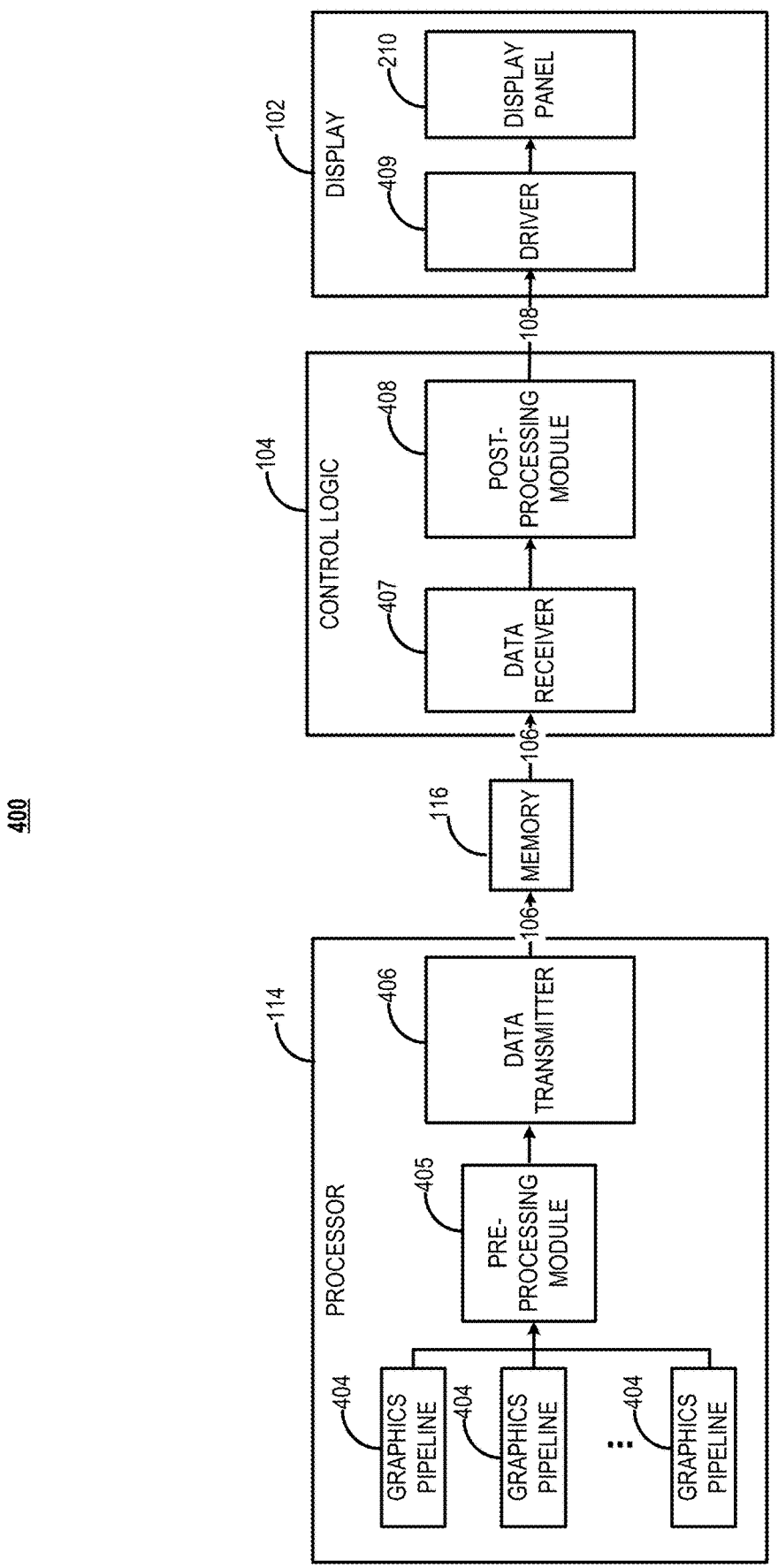
FIG. 4A is a block diagram illustrating a system including a display, a control logic, and a processor in accordance with an embodiment.

FIG. 4A is a block diagram illustrating a display system 400 including a display 102, control logic 104, and a processor 114 in accordance with an embodiment.

As described above, processor 114 may be any processor that can generate display data 106, e.g., pixel data and/or compensation data, in each frame and provide display data 106 to control logic 104. Processor 114 may be, for example, a GPU, AP, APU, or GPGPU. Processor 114 may also generate other data, such as but not limited to, control instructions 118 (optional in FIG. 1) or test signals (not shown in FIG. 4A), and provide them to control logic 104.

The stream of display data 106 transmitted from processor 114 to control logic 104 may include original display data and/or compensation data for pixels on display panel 210.

In this embodiment, processor 114 includes graphics pipelines 404, a pre-processing module 405, and a data transmitter 406. Each graphics pipeline 404 may be a two-dimensional (2D) rendering pipeline or a three-dimensional (3D) rendering pipeline that transforms 2D or 3D images having geometric primitives in the form of vertices into pieces of display data, each of which corresponds to one pixel on display panel 210. Graphics pipeline 404 may be implemented as software (e.g., computing program), hardware (e.g., processing units), or combination thereof. Graphics pipeline 404 may include multiple stages such as vertex shader for processing vertex data, rasterizer for converting vertices into fragments with interpolated data, pixel shader for computing lighting, color, depth, and texture of each piece of display data, and render output unit (ROP) for performing final processing (e.g., blending) to each piece of display data and write them into appropriate locations of a frame buffer (not shown). Each graphics pipeline 404 may independently and simultaneously process a set of vertex data and generate the corresponding set of display data in parallel.

In this embodiment, graphics pipelines 404 are configured to generate a plurality of pieces of display data, including pixel data and/or compensation data, in each frame for the pixels on display panel 210. Each piece of the display data may correspond to one pixel of the array of pixels on display panel 210. For example, for a display panel having a resolution of 2400×2160, the display data generated by graphics pipelines 404 in each frame includes 2400×2160 pieces, each of which represents a set of values of electrical signals to be applied to the respective pixel (e.g., consisting of a number of subpixels). The display data may be generated by graphics pipelines 404 at a suitable frame rate (e.g., frequency) at which consecutive display frames are provided to display panel 210, such as 30 fps, 60 fps, 72 fps, 120 fps, or 240 fps. In some embodiments, graphics pipelines 404 only generates pixel data, and compensation data is generated by a separate unit, e.g., a compensation data generating unit, in pre-processing module 405. The specific ways to generate compensation data should not be limited by the embodiments of the present disclosure.

Figure 4B:
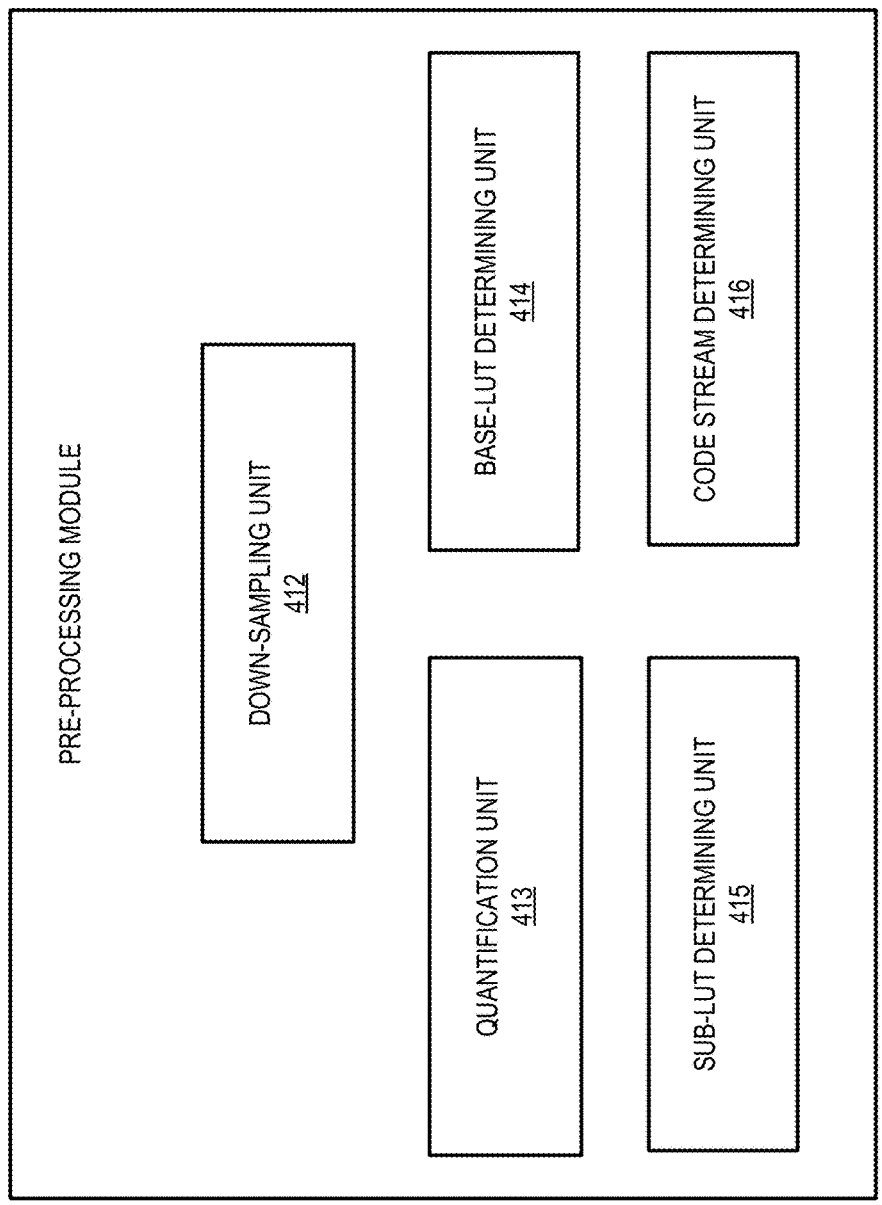
FIG. 4B is a detailed block diagram illustrating one example of a pre-processing module in the processor shown in FIG. 4A in accordance with an embodiment.

Pre-processing module 405 may be operatively coupled to graphics pipelines 404 and configured to process the display data of display panel 210 provided by graphics pipelines 404 to, e.g., generate compensation data and compress the compensation data. FIG. 4B is a detailed block diagram illustrating one example of pre-processing module 405 in processor 114 shown in FIG. 4A in accordance with an embodiment. In this embodiment, pre-processing module 405 includes a down-sampling unit 412, a quantification unit 413, a base-lut determining unit 414, a sub-lut determining unit 415, and a code stream determining unit 416. Graphics pipelines 404 may generate a plurality of pieces of compensation data in each frame. Each piece of compensation data may be employed to compensate one pixel on display panel 210. For example, for a display panel having a resolution of 2400×2160, the compensation data generated in each frame includes 2400×2160 pieces, each of which represents a set of values of electrical signals to be applied to the respective pixel (e.g., consisting of a number of subpixels). In some embodiments, each piece of compensation data corresponds to (or is employed to compensate) one respective subpixel. In some embodiments, the resolution refers to the physical/native resolution of display panel 210. In various embodiments, each piece of compensation data (e.g., each set of values of electrical signals) can be a single value or a plurality of values.

Figure 5A:
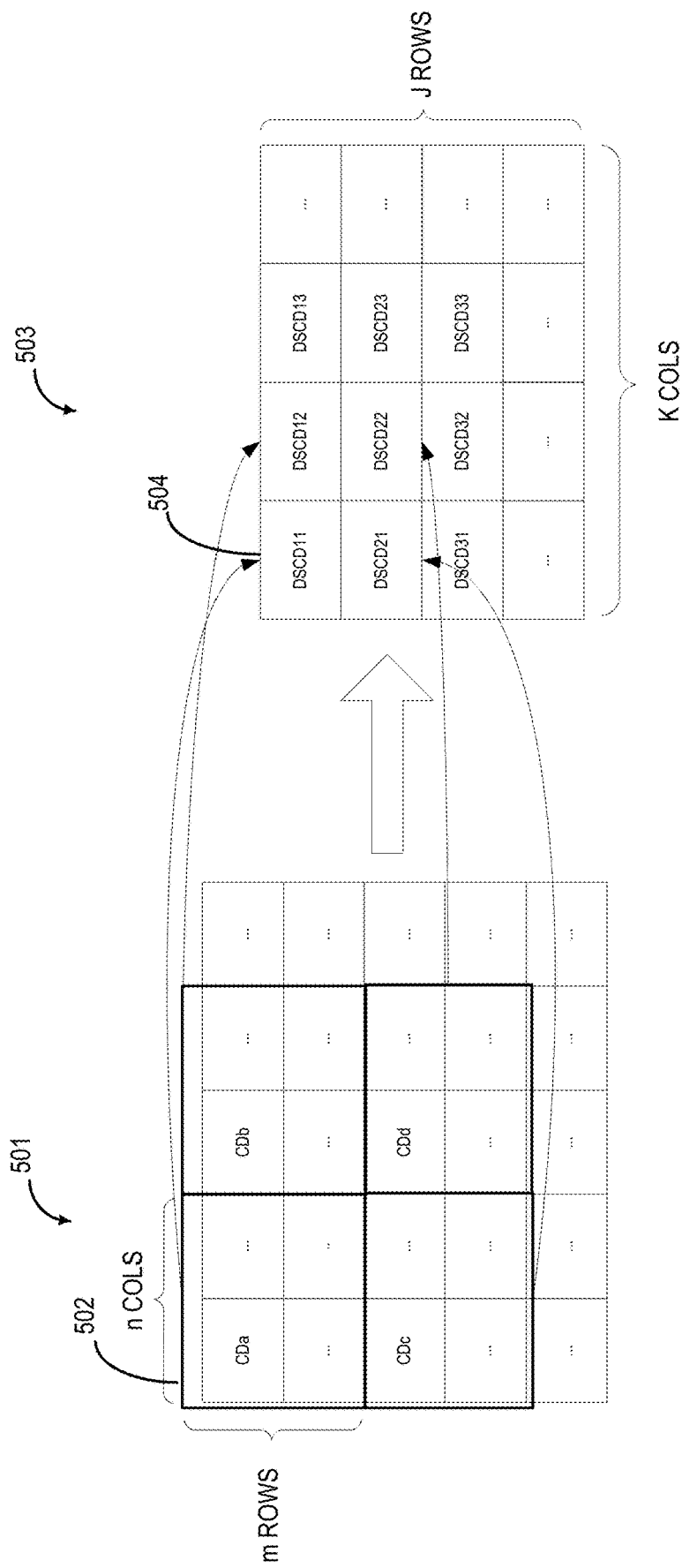
FIG. 5A illustrates an exemplary down-sampling operation on a display panel in accordance with an embodiment.

In some embodiments, in each frame, pre-processing module 405 performs a down-sampling operation on the compensation data. A plurality of pieces of down-sampled compensation data can be generated. The down-sampling operation can be performed by down-sampling unit 412. Down-sampling unit 412 may determine a plurality of pieces of down-sampled compensation data. Each piece of the down-sampled compensation data may represent the down-sampled value(s) of more than one piece of compensation data. The size (e.g., the number of pieces) of the down-sampled compensation data may thus be less than the size (e.g., the number of pieces) of compensation data (e.g., before the down-sampling process). In some embodiments, down-sampling unit 412 determines a down-sampling factor (e.g., greater than 1) that represents the scale by which the size of the compensation data is reduced. FIG. 5A illustrates an exemplary down-sampling process performed by down-sampling unit 412.

As shown in FIG. 5A, down-sampling unit 412 may receive a plurality of pieces of compensation data generated by graphics pipelines 404. The compensation data may be arranged in an array 501 of a plurality of rows and a plurality of columns. Each row may include a plurality of pieces of compensation data arranged in a row direction (e.g., horizontal direction), and each column may include a plurality of pieces of compensation data arranged in a column direction (e.g., vertical direction). In some embodiments, down-sampling unit 412 determines a down-sampling factor of m×n, which corresponds to a block of compensation data in m rows and n columns. In some embodiments, m and n are each positive integers, with m being less than the number of rows and n being less than the number of columns. In some embodiments, m×n is also referred to as a block size. In some embodiments, down-sampling unit 412 divides array 501 into a plurality blocks and obtains the down-sampled value(s) of each block. In some embodiments, each block has the same block size, e.g., m×n. In some embodiments, each block is down-sampled to be represented by a single down-sampled compensation value.

In some embodiments, the dimensions (i.e., the number of rows and the number of columns) of the compensation data are the same as those of the pixel data. That is, the number of rows in array 501 is equal to the number of rows of pixels in display panel 210, and the number of columns in array 501 is equal to the number of columns of pixels in display panel 210. That is, the size (or dimensions) of array 501 corresponds to the arrangement of pixels in display panel 210, and each element (i.e., each piece of compensation data) of array 501 represents the compensation data for a respective pixel in display panel 210. Accordingly, each block corresponds to an m×n pixel array/block in display panel 210. In some embodiments, down-sampling unit 412 divides the array of compensation data (e.g., having a size of (mJ)×(nK)) into J×K blocks 502, each block 502 includes m×n pieces of compensation data. J may be equal to the number of rows divided by m, and K may be equal to the number of columns divided by n. For example, blocks 502 each include a plurality of pieces of compensation data, e.g., CDa, CDb, CDc, CDd, . . . , and so on.

Down-sampling unit 412 may determine a plurality of pieces of down-sampled compensation data based on the division of the compensation data. In some embodiments, as an exemplary data structure, down-sampled compensation data is arranged in a J×K array 503, with each element 504 (e.g., DSCD11, DSCD12, . . . ) being a piece of down-sampled compensation data. In some embodiments, each element is a down-sampled compensation value. In some embodiments, the size of array 503, e.g., J×K, is less than the size of the array 501. As shown in FIG. 5A, down-sampling unit 412 may down-sample pieces of compensation data (e.g., CDa, . . . ) in the upper left block 502 and determine a piece of down-sampled compensation data (e.g., DSCD11) for the upper left block 502. In some embodiments, down-sampling unit 412 stores DSCD11 array 503. In some embodiments, down-sampling unit 412 also down-samples the pieces of compensation data (e.g., CDb, CDc, CDd, . . . ) from the upper right, lower left, and lower right blocks 502, determines and stores the respective pieces of down-sampled compensation data (e.g., DSCD12, DSCD21, DSCD22, . . . ) on the right, lower left, and lower right of DSCD11 in array 503. In some embodiments, the arrangement of down-sampling data in array 503 may correspond to the arrangement of the J×K blocks of compensation data. In some embodiments, down-sampling unit 412 sequentially determines the down-sampled compensation row by row or column by column. In some embodiments, J×K array 503 includes J×K down-sampled compensation values. That is, DSCD11, DSCD12, DSCD13, . . . , DSCD21, DSCD22, DSCD23, . . . , DSCD31, DSCD32, DSCD33, . . . , may each be a down-sampled compensation value of the respective block in array 501. In some embodiments, the down-sampling operation is a lossy data compression process.

Down-sampling unit 412 may down-sample block 502 using any suitable methods such as an average down-sampling method, a median down-sampling method, a max down-sampling method, a min down-sampling method, a position-specified down-sampling method, and/or a gradient down-sampling method. For example, for each block 502, the respective piece of down-sampled compensation data (or down-sampled compensation value) may be the average value of the compensation data in block 502 (e.g., using the average down-sampling method), the median value of the compensation data in block 502 (e.g., using the median down-sampling method), the maximum value of the compensation data in block 502 (e.g., using the max down-sampling method), the minimum value of the compensation data in block 502 (e.g., using the min down-sampling method), a position-specified value of the compensation data in block 502 (e.g., using the position-specified down-sampling method), and/or a gradient value of block 502 (e.g., using the gradient down-sampling method). In some embodiments, the position-specified value of block 502 refers to the value of a piece of compensation data at a specific location/element of block 502. For example, down-sampling unit 412 may determine the down-sampled compensation data/value of block 502 to be the value of the piece of compensation data of the first upper left element in block 502. In some embodiments, the gradient value refers to the highest gradient value of block 502. The gradient of each pixel corresponding to block 502 can be calculated to be $abs((f(x+1, y)-f(x-1, y))/2)+abs((f(x, y+1)-f(x, y-1))2+abs((f(x-1, y-1)-f(x+1, y+1))/(2 \times 2^{0.5}))+abs((f(x-1, y+1)-f(x+1, y-1))/(2 \times 2^{0.5}))$, in which abs(f) represents the absolute value of a function, (x, y) represents the coordinates of a pixel, and f(x, y) represents the compensation value(s) of a pixel.

In various embodiments, the block size of one block 502 can be different from that of another block 502. That is, values of m and n may vary for different blocks 502. In some embodiments, the block size of one block 502 in one row/column is different from the block size of another block 502 in another row/column. The size of the array of array 503, i.e., J×K, may vary accordingly as the values of m and/or n change. In some embodiments, more than one down-sampling method is used to down-sample the J×K blocks. For example, the down-sampling method to down-sample one block 502 in one row/column is different from the down-sampling method to down-sample another block 502 in another row/column.

Pre-processing module 405 may determine a plurality of pieces of quantified down-sampled compensation data from the down-sampled compensation data. This operation may be performed by quantification unit 413. Quantification unit 413 may quantify the down-sampled compensation data to form the quantified down-sampled compensation data. Quantification unit 413 may determine a plurality of different (i.e., non-repeating) pieces of down-sampled compensation data, arrange the non-repeating pieces of down-sampled compensation data in an order, and quantify one or more adjacent non-repeating pieces of down-sampled compensation data to form the quantified down-sampled compensation data. The number of pieces of the quantified down-sampled data is thus less than the number of pieces of the down-sampled data. In some embodiments, the order in which the non-repeating down-sampled compensation data is arranged is an ascending order. In some embodiments, each piece of down-sampled compensation data is a down-sampled compensation value, and the plurality of non-repeating down-sampled compensation values are arranged in the ascending order. In some embodiments, quantification unit 413 also determines the number of occurrence of each piece of down-sampled compensation data in the plurality of pieces down-sampled compensation data (e.g., in array 503). An number of occurrence is represented by an occurrence number (num0, num1, num2, . . . ) determined by quantification unit 413.

Figure 5B:
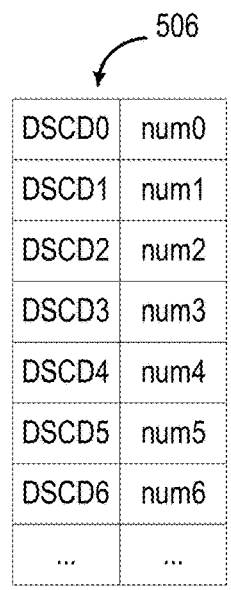
FIG. 5B depicts a plurality of pieces of exemplary down-sampled compensation data in an exemplary order in accordance with an embodiment.

FIG. 5B illustrates a plurality of non-repeating pieces of down-sampled compensation data arranged (e.g., in a queue) in an ascending order. In some embodiments, quantification unit 413 stores the non-repeating down-sampled compensation data in the order in a table 506. DSCD0, DSCD1, DSCD2, . . . , DSCD6, . . . represent all the different (e.g., non-repeating) pieces of down-sampled compensation data occurred in array 503. In some embodiments, DSCD0, DSCD1, DSCD2, . . . , DSCD6, . . . each represents a different value. In some embodiments, quantification unit 413 determines a plurality of occurrence numbers, num0, num1, num2, . . . , num6, . . . , each representing the number of occurrence of the respective piece of non-repeating down-sampled compensation data (DSCD) in array 503. In some embodiments, all the non-repeating down-sampled compensation data is stored in a column of table 506, the occurrence numbers are stored in another column of table 506, and each occurrence number is mapped to the respective piece of down-sampled compensation data. In some embodiments, the number of non-repeating pieces of down-sampled compensation data is X (e.g., X rows in table 506), and table 506 may have a size of X×2. For example, DSCD0 may be the smallest non-repeating down-sampled compensation value and is sorted to be the first of the queue. DSCD0 may have an occurrence number num0, e.g., 50, and may occur as DSCD11, DSCD13, DSCD21, . . . . That is, DSCD0 may occur repeatedly (e.g., for 50 times) in array 503 of down-sampled compensation data. Arranged in the ascending order, DSCD1 may be the second smallest down-sampled compensation value and is sorted to be the second of the queue, DSCD2 may be the third smallest down-sampled compensation value and is sorted to be the third one in the queue.

Pre-processing module 405 may determine a plurality of pieces of quantification data based on the down-sampled compensation data in the (e.g., ascending) order. Each piece of quantification data may be different from one another and may represent the quantification of a plurality of adjacent non-repeating pieces of the down-sampled compensation data in the order. Quantification unit 413 may perform this operation. Quantification unit 413 may determine the quantification data using the down-sampled compensation data in table 506. In some embodiments, quantification unit 413 determines the quantification data using the down-sampled compensation data and the respective occurrence numbers in table 506. In some embodiments, the plurality of pieces of quantification data includes a plurality of quantification values, each represents the quantification of a plurality of adjacent non-repeating pieces of down-sampled compensation data in table 506. The number of adjacent pieces of down-sampled compensation data may be referred to as j, which is a step number that includes any suitable positive integer less than the total number of non-repeating pieces of down-sampled compensation data (i.e., X).

Figure 5C:
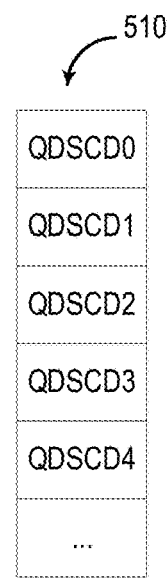
FIG. 5C depicts a plurality of exemplary quantification values in accordance with an embodiment.

FIG. 5C illustrates a plurality of pieces of exemplary quantification data QDSCD0, QDSCD1, QDSCD2, . . . , determined from the quantification of non-repeating down-sampled compensation data in table 506. Each one of QDSCD0, QDSCD1, QDSCD2, . . . , may be different from one another (non-repeating) and represent the quantification of one or more pieces of down-sampled compensation data in table 506. In some embodiments, each one of QDSCD0, QDSCD1, QDSCD2, . . . , is a quantified value. In some embodiments, QDSCD0, QDSCD1, QDSCD2, . . . , are arranged in a queue in an ascending order. In some embodiments, quantification unit 413 stores the queue in a table 510. The value of j may be greater than 1. In various embodiments, the value of j can be 2, 3, 4, . . . , or 16. For example, j may be equal to 3, and quantification unit 413 may determine the quantification of DSCD0, DSCD1, and DSCD2 to be quantification value QDSCD0, and the quantification of DSCD3, DSCD4, and DSCD5 to be quantification value QDSCD1. In some embodiments, j is a constant value for all quantification values. In some embodiments, j varies for different quantification values. In various embodiments, the value of j for each quantified value is determined based on the methods employed to determine the quantification values. In some embodiments, the size of the queue in table 510 (e.g., the number of rows or the number of quantified values) is equal to Y, Y being less than or equal to X. In some embodiments, Y is less than X.

Quantification unit 413 may employ any suitable methods to determine the quantification data. In some embodiments, the methods include an average quantification method, a max quantification method, a min quantification method, a median quantification method, and/or a range-defined quantification method. For example, quantification unit 413 may determine a quantified value to be equal to the average value of the j adjacent pieces of down-sampled compensation data (e.g., using the average quantification method), the maximum value of the j adjacent pieces of down-sampled compensation data (e.g., using the max quantification method), the minimum value of the j adjacent pieces of down-sampled compensation data (e.g., using the min quantification method), the median value of the j adjacent pieces of down-sampled compensation data (e.g., using the median quantification method), and/or a range-defined value of the j adjacent pieces of down-sampled compensation data (e.g., using the range-defined quantification method). In various embodiments, quantification data can be determined using the same quantification method or different quantification methods.

Figures 5D, 5E:
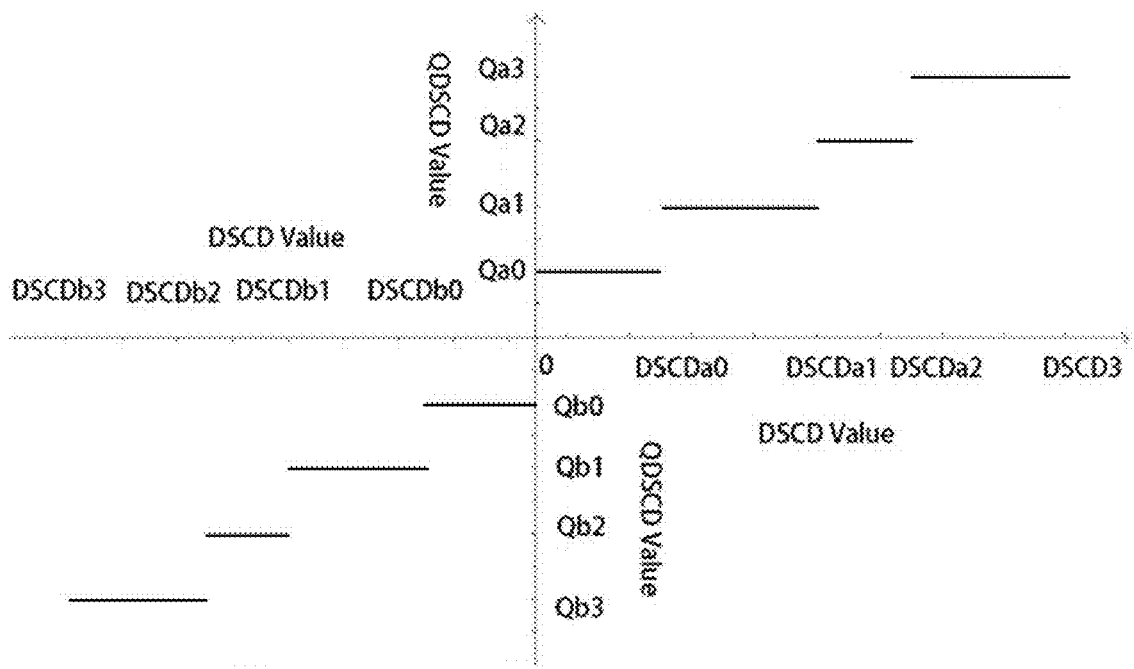
FIG. 5D depicts an exemplary range-defined quantification method in accordance with an embodiment.
FIG. 5E depicts a plurality of pieces of exemplary quantified down-sampled compensation data in in accordance with an embodiment.

FIG. 5D illustrates an exemplary range-defined quantification method. The x-axis represents the values of down-sampled compensation data ("DSCD Value"), and the y-axis represents the values of the quantified down-sampled compensation data ("QDSCD Value"). In some embodiments, quantification unit 413 determines a plurality of ranges along the x-axis based on the values of down-sampled compensation data. Each range may be defined by a pair of threshold values. In some embodiments, for each range, quantification unit 413 determines a quantification value to be the quantified down-sampled compensation data of any down-sampled compensation data in the respective range. The quantification value of each range may be different from one another. For ease of illustration, FIG. 5D shows eight ranges, respectively defined by 8 pairs of threshold values (DSCDb3, DSCDb2), (DSCDb2, DSCDb1), (DSCDb1, DSCDb0), (DSCDb0, 0), (0, DSCDa0), (DSCDa0, DSCDa1), (DSCDa1, DSCDa2), and (DSCDa2, DSCDa3). Respectively, the eight ranges may correspond to quantification values Qb3, Qb2, Qb1, Qb0, Qa0, Qa1, Qa2, and Qa3. That is, any piece of down-sampled compensation data (or non-repeating piece of down-sampled compensation data) falling into a respective range is quantified to be the respective quantification value of the range. For example, DSCD0, DSCD1, and DSCD2 may be in the range of (DSCDb2, DSCDb1), and quantification unit 413 may determine the quantification of DSCD0, DSCD1, and DSCD2 is equal to Qb2. That is, the quantified value corresponding to DSCD0, DSCD1, and DSCD2 is Qb2. In some embodiments, the threshold values are determined based on the distribution of down-sampled compensation data. For example, a pair of threshold values can be determined to include a maximum number of adjacent non-repeating pieces of down-sampled compensation data such that the number of quantification values can be reduced, improving the compression efficiency and reduce the storage space of the compressed compensation data.

In some embodiments, as shown in FIG. 5D, the ranges are continuous, e.g., one range immediately following another range. In some embodiments, the ranges are discontinuous, e.g., one range is apart from another range. The number of non-repeating pieces of down-sampled compensation data (i.e., j) in each range may be the same or different. In some embodiments, the down-sampled compensation data is nominally evenly distributed. In some embodiments, the values of the j adjacent non-repeating pieces of down-sampled compensation data have small and/or linearly changes along the y-axis. In this case, in some embodiments, the quantified values are nominally evenly distributed along the y-axis and j is the same number for all quantification values. In an example, DSCDa0 is equal to 3, Qa0 is equal to 2, and DSCD0, DSCD1, and DSCD2 are equal to 1, 2, and 3, respectively. The quantification of (or the quantified value corresponding to) DSCD0, DSCD1, and DSCD2 is then equal to 2. Referring back to FIG. 5C, after the quantified value (e.g., Qb3, Qb2, Qb1, Qb0, Qa0, Qa1, Qa2, Qa3) of each j adjacent pieces of down-sampled compensation data is determined, quantification unit 413 sorts the quantified values in a queue in an ascending order. For ease of illustration, the quantified data arranged in the queue is represented as a plurality of quantified values: QDSCD0, QDSCD1, QDSCD2, QDSCD3, . . . .

FIG. 5E illustrates a plurality of pieces of quantified down-sampled compensation data in an array 512. In some embodiments, the size of array 512 is J×K. Each element of array 512 may have identical value(s) as the quantified value of the corresponding piece of down-sampled compensation data in array 503. In some embodiments, array 512 includes J×K quantified down-sampled compensation values. In some embodiments, quantification unit 413 generates array 512 based on table 510 and array 503, e.g., by substituting each piece of down-sampled compensation data in array 503 with the quantified value in table 510 and generating a respective piece of quantified down-sampled compensation data (e.g., equal to the quantified value). In some embodiments, quantification unit 413 maps each piece of down-sampled compensation data in array 503 (e.g., sequentially or in parallel) to the non-repeating piece of down-sampled compensation data of identical value(s) in table 506, and maps the non-repeating piece of down-sampled compensation data to the quantified values in table 510. For example, QDSCD11 represents the quantified value of DSCD11, QDSCD12 represents the quantified value of DSCD12, QDSCD21 represents the quantified value of DSCD21, etc. Because elements in array 512 is determined based on table 510, each element in array 512 (QDSCD11, QDSCD12, . . . ) is equal to one of the elements (QDSCD0, QDSCD1, . . . ) in table 510.

Quantification unit 413 may sort the quantified data (e.g., Y quantified values) in table 510 by the numbers of occurrence and generate a plurality of first indices each mapped to a quantified value. The values of the first indices may be non-repeating and may include any suitable non-negative integers. In some embodiments, the occurrence number of each quantified value (i.e., QDSCD0, QDSCD1, QDSCD2, QDSCD3, . . . ) is determined, representing the number of occurrence of each quantified value in array 512. In some embodiments, the quantified data is sorted in a descending order of the occurrence numbers. In some embodiments, the sorted quantified data are arranged in a queue. Each quantified value may correspond to an occurrence number and a first index. In some embodiments, quantification unit 413 stores the sorted quantified data, the occurrence numbers, and the first indices respectively in columns in a table. In some embodiments, each quantified value is mapped to the respective occurrence number and the first index.

FIG. 5F illustrates an exemplary table 514 in which quantified data (i.e., non-repeating) are arranged in a column based on the descending order of the corresponding occurrence numbers. In some embodiments, num0≥num1≥num2≥num3, . . . . A plurality of first indices (I0, I1, I2, . . . ), each mapped to a respective quantified value (or a respective quantified value or respective occurrence number), are stored in another column of table 514. In some embodiments, I0, I1, I2, . . . , are respectively equal to 0, 1, 2, . . . . In some embodiments, quantification unit 413 determines whether the number of first indices (i.e., the number of non-repeating quantified values) exceeds a predetermined size limit, which can be any suitable positive integer such as 16, 32, 64, or so. If quantification unit 413 determines the number of first indices is greater than the predetermined size limit, quantification unit 413 may increase the value of j (the number of adjacent pieces of down-sampled compensation data in table 506 or step number) and perform the quantification of down-sampled compensation data again. Quantification unit 413 may keep adjusting the values of j until the number of first indices (or Y) is equal to or less than the predetermined size limit. In some embodiments, the size of table 514 is Y×3, Y being less than or equal to the predetermined size limit.

The range of first indices may be smaller than the range of the non-repeating quantified values. For example, the non-repeating quantified values may include negative values, zero, and/or positive values, and the first indices may include only non-negative values. It should be noted that, in various embodiments, the first indices can include any set of values that have a smaller range than the non-repeating quantified values. For example, non-repeating quantified values may range from −20 to 20, the first indices may range from 0 to 30, −15 to 15, etc. The specific values and number of first indices should not be limited by the embodiments of the present disclosure.

Figure 5G:
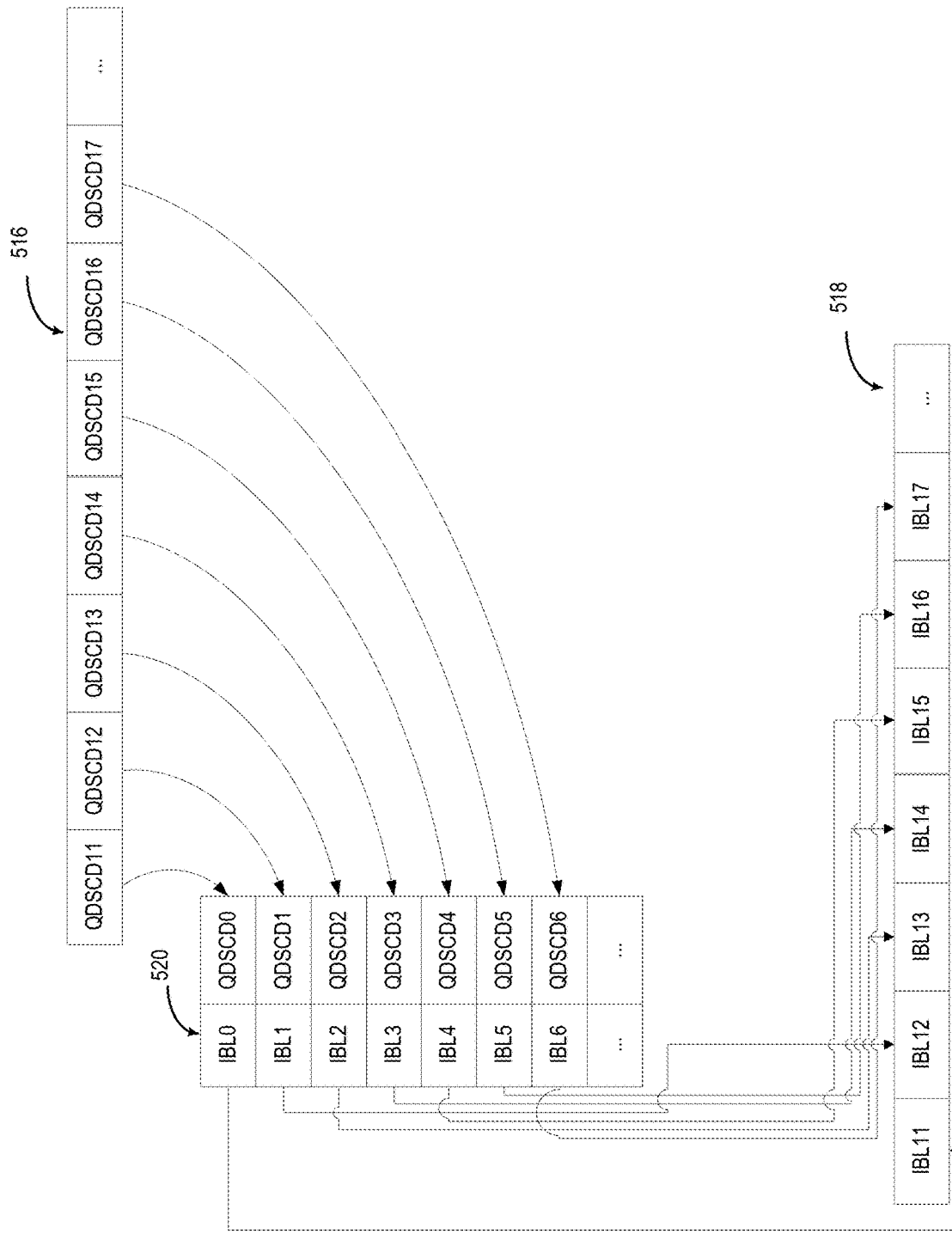
FIG. 5G illustrates an exemplary formation of index of base lut (IBL) data in accordance with an embodiment.

Pre-processing module 405 may determine a base lookup table (base lut or first lookup table) based on table 514 to form IBL data (or index data). Base-lut determining unit 414 may perform this operation. In some embodiments, base-lut determining unit 414 may form the base lookup table that includes all first indices (i.e., Y first indices I0, I1, I2, . . . ) and corresponding non-repeating quantified values (i.e., Y quantified values QDSCD0, QDSCD1, QDSCD2, . . . ) in table 514. FIG. 5G illustrates an exemplary base lookup table 520. In some embodiments, a first column of base lookup table 520 includes the Y first indices, which are arranged in the same order as in table 514. For illustrative purposes, the first indices are represented by IBL0, IBL1, IBL2, . . . (i.e., I0=IBL0, I1=IBL1, I2=IBL2, . . . ) in base lookup table 520. The second column of base lookup table 520 may include the Y quantified values arranged in the same order as in table 514.

Base-lut determining unit 414 may determine a plurality of pieces of IBL data based on base lookup table 520 and quantified down-sampled compensation data in array 512. In some embodiments, the IBL data is stored in a J×K array, and each element of the array is an IBL value corresponding to a respective piece of quantified down-sampled compensation data in array 512 (or the corresponding piece of down-sampled compensation data in array 503). Each IBL value is identical to the value of the first index mapped to the non-repeating quantified value (in base lookup table 520 or table 514) that has identical value(s) to the piece of quantified down-sampled compensation data in array 512.

FIG. 5G illustrates an exemplary formation of IBL data. In some embodiments, the IBL data is formed by converting quantified down-sampled compensation data into a plurality of non-negative values using base lookup table 520. As shown in FIG. 5G, base-lut determining unit 414 may form the array of IBL data row by row or column by column. As an example, base-lut determining unit 414 may select a row 516 (or a column, not shown) of quantified down-sampled compensation data from array 512, and determine a first index, based on base lookup table 520, for each element in row 516 (or column). A row 518 (or column, not shown) of IBL values may be formed, each element in row 518 (or column) being the IBL value mapped to the respective piece of quantified down-sampled compensation data. In some embodiments, base-lut determining unit 414 sequentially selects the rows from array 512, e.g., from top to bottom, and form the array of IBL data row by row. In some embodiments, base-lut determining unit 414 sequentially selects the columns from array 512, e.g., from left to right, and form the array of IBL data column by column. In some embodiments, the space for storing the array of IBL data is smaller than the space for storing array 512 of quantified down-sampled compensation data.

In some embodiments, base-lut determining unit 414 selects a row 516 (e.g., the first row) of array 512, which includes K pieces of quantified down-sampled compensation data (e.g., QDSCD11, QDSCD12, QDSCD13, . . . ). Base-lut determining unit 414 may map each piece of the quantified down-sampled compensation data (e.g., QDSCD11, QDSCD12, QDSCD13, . . . ) in row 516 to one of the sorted quantified values of the same value in base lookup table 520 (e.g., QDSCD0, QDSCD1, QDSCD2), and determine the first index (IBL0, IBL1, IBL2, . . . ) mapped to the quantified value that is mapped to the respective piece of quantified down-sampled compensation data. Base-lut determining unit 414 may then generate a row of K IBL values, each having the identical value as the respective first index (IBL0, IBL1, IBL2, . . . ) in base lookup table 520. For example, base-lut determining unit 414 may map QDSCD11 (i.e., the first element in row 516 and element (1,1) in array 512) to QDSCD0 (e.g., having identical value as QDSCD11), determine first index IBL0 (i.e., mapped to QDSCD0), and determine IBL11 (i.e., element (1,1) in the array of IBL data) to have the value of IBL0. Base-lut determining unit 414 may process each element in row 516 in sequence or in parallel. Row 518 of IBL data, i.e., including a plurality of IBL values of IBL11, IBL12, IBL13, . . . , may be formed. Base-lut determining unit 414 may form the J×K array of IBL data, each element of the array corresponds to the value of the first index mapped to the corresponding quantified down-sampled compensation data in array 512 (or the corresponding down-sampled compensation data in array 503) through the quantified data. In some embodiments, the space for storing each row (e.g., row 518) of IBL data is smaller than the space for storing each row (e.g., row 516) of array 512.

Figure 5H:
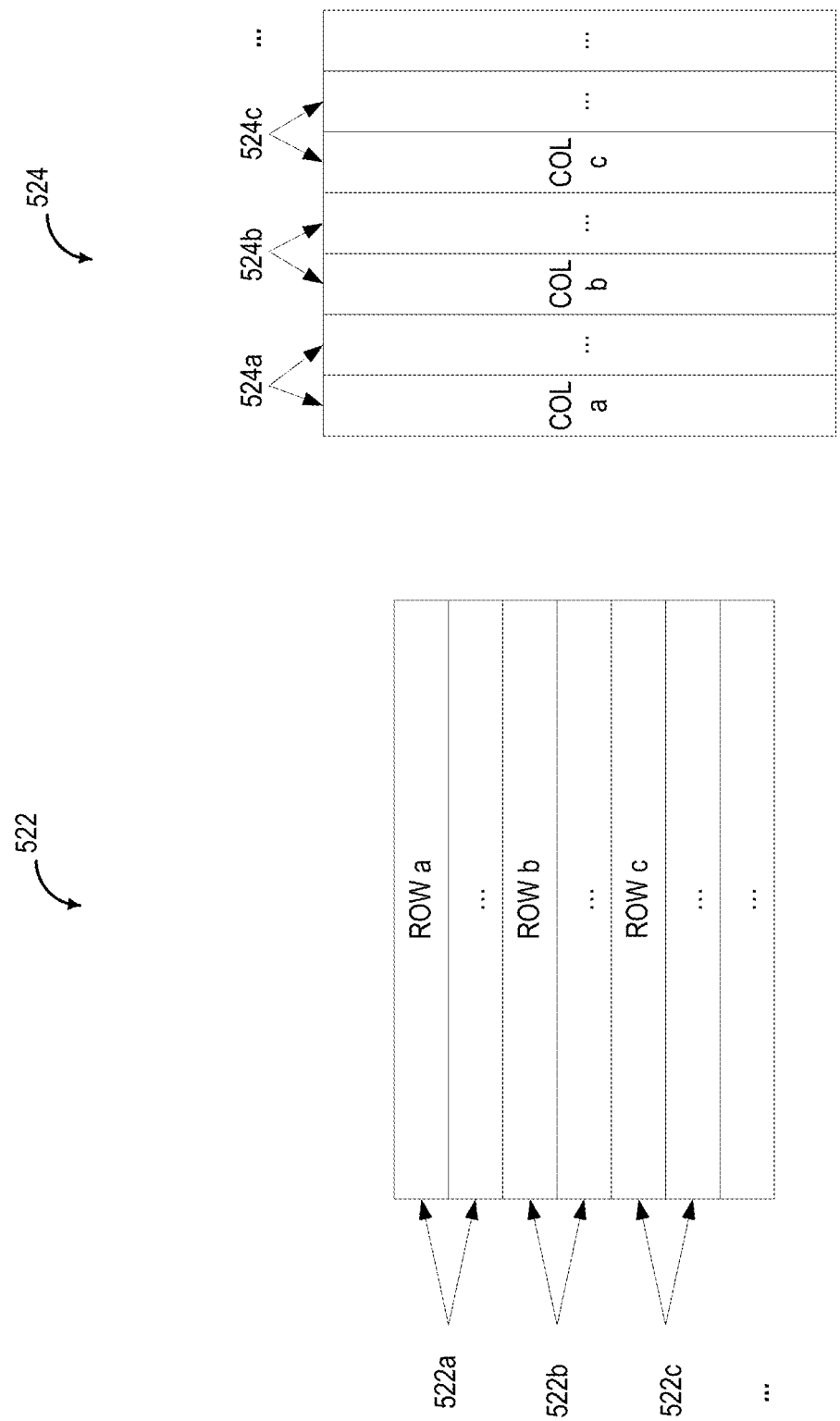
FIG. 5H illustrates exemplary divisions to form M units of IBL data in accordance with an embodiment.

Pre-processing module 405 may further divide the array of IBL data into M units, M being a positive number less than J or K. Base-lut determining unit 414 may perform the operation. In some embodiments, the array of IBL data is divided by the row, and each unit includes one or more rows of the array of IBL data, M being less than J. In some embodiments, the array is divided by the column, and each unit includes one or more columns of the array of IBL data, M being less than K. In some embodiments, each unit includes one row and M is equal to J. In some embodiments, each unit includes one column and M is equal to K. In some embodiments, every two adjacent rows form a unit, and M is equal to J/2. In some embodiments, every two adjacent columns form a unit, and M is equal to K/2. FIG. 5H illustrates exemplary divisions 522 and 524. In division 522, M units, 522a, 522b, 522c, . . . , each including two adjacent rows of IBL data, are formed. In division 524, M units, 524a, 524b, 524c, . . . , each including two adjacent columns of IBL data, are formed.

Figure 5I:
FIG. 5I depicts a plurality of IBL values in an exemplary order in accordance with an embodiment.

Pre-processing module 405 may then sort, in each of the M units, the first indices by the numbers of occurrence. Sub-lut determining unit 415 may perform the operation. In some embodiments, sub-lut determining unit 415 determines the occurrence number of each non-repeating first index in the unit and sort the non-repeating first indices by the occurrence numbers. In some embodiments, the occurrence numbers are arranged in a descending order. FIG. 5I illustrates an exemplary order in which the non-repeating first indices (IBL0, IBL1, IBL2, . . . ) in each unit are arranged by the descending occurrence numbers in a queue. In some embodiments, sub-lut determining unit 415 generates a table 526 in which the sorted non-repeating first indices are stored in a column, and the occurrence numbers (num0, num1, num2, . . . ) of the first indices are arranged in another column. Each occurrence number is mapped to the respective first index, as shown in table 526. In some embodiments, M tables are generated, each corresponding to a respective unit of IBL values/data. In some embodiments, sub-lut determining unit 415 selects the column of the sorted non-repeating first indices and employs the column as an initial sub lookup table. M initial sub lookup tables may be formed. In some embodiments, pre-processing module 405 converts the IBL data (e.g., formed by the conversion illustrated in FIG. 5G and arranged in the J×K array) into M code streams based on N of the M initial sub lookup tables. Details are described as follows.

In some embodiments, for each unit, sub-lut determining unit 415 also determines a plurality of second indices (i.e., IIBL0, IIBL1, IIBL2, . . . ), each mapped to a respective first index. The values of the second indices may be non-repeating and may include any suitable integer greater than or equal to 0. In some embodiments, IIBL0, IIBL1, IIBL2, . . . , are respectively equal to 0, 1, 2, . . . . In some embodiments, the second indices are stored and stored in another column of table 526, as shown in FIG. 5I, each second index is mapped to the respective first index and occurrence number. In some embodiments, sub-lut determining unit 415 selects the columns of the first indices and the second indices and employs the two columns as an initial sub lookup table. In an example, in table 526, IBL0 is equal to 0, num0 is equal to 100, and IIBL0 is equal to 0; IBL1 is equal to 1, num1 is equal to 50, and IIBL0 is equal to 1; IBL2 is equal to 2, num2 is equal to 30, and IIBL2 is equal to 2; and IBL3 is equal to 3, num3 is equal to 20, and IIBL2 is equal to 3.

As described earlier, for each unit, sub-lut determining unit 415 may determine an initial sub lookup table based on table 526. In some embodiments, the initial sub lookup table includes one column, which includes the sorted non-repeating first indices. In some embodiments, the initial sub lookup table includes two columns, which include one column of the first indices arranged in the order and another column of second indices each mapped to the respective first index. M initial sub lookup tables can be formed. The M initial sub lookup tables may or may not include repeating initial sub lookup tables. In some embodiments, sub-lut determining unit 415 sorts the M initial sub lookup tables based on their numbers of occurrence. In some embodiments, the occurrence number of each initial sub lookup table is determined, and sub-lut determining unit 415 sorts the M initial sub lookup tables based on a descending order of the occurrence numbers. In some embodiments, sub-lut determining unit 415 then selects N initial sub lookup tables with the highest occurrence numbers (e.g., the top N initial sub lookup tables). In some embodiments, N is a suitable positive integer, less than or equal to M, such as 16 or 32. In some embodiments, sub-lut determining unit 415 determines an index for each of the N initial sub lookup tables.

For each of the M units of IBL data, pre-processing module 405 may form N initial code streams based on the respective unit and the N initial sub lookup tables. A stream size (e.g., size) of each initial code stream may be determined and the initial code stream with the shortest stream size may be determined to be the code stream of the respective unit. Pre-processing module 405 may also determine the initial sub lookup table used to generate the code stream to be the sub lookup table (e.g., second lookup table) of the respective unit. The index of the sub lookup table may be determined to be the index of the corresponding initial sub lookup table. Code stream determining unit 416 may perform these operations. In some embodiments, for M units, M code streams, each corresponding to a respective unit, are determined. Code stream determining unit 416 may accordingly determine the stream size of each code stream, the sub lookup table of each unit, and the index of the respective sub lookup table. In various embodiments, code stream determining unit 416 determines the code stream, the stream size, and the index of the sub lookup table of each of the M units sequentially or in parallel.

Figure 5J:
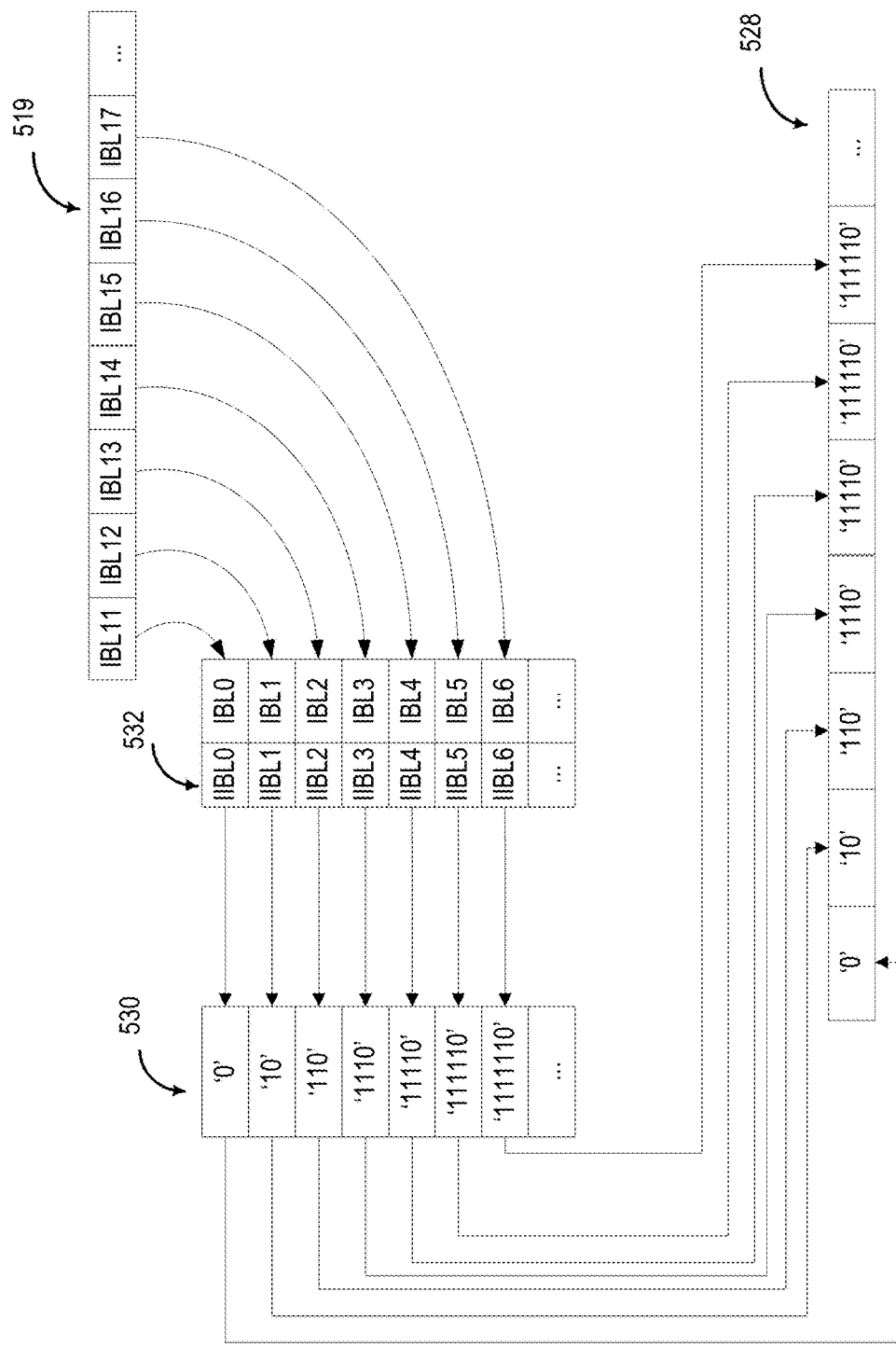
FIG. 5J illustrates an exemplary formation of initial code streams in accordance with an embodiment.

FIG. 5J illustrates an exemplary formation of an initial code stream. In some embodiments, the initial code stream is formed by converting a unit of IBL data into a plurality of sets of binary codes using one of the N initial sub lookup tables and a variable-length coding table. The space for storing the binary codes may be smaller than the space for storing the respective IBL data, improving the compression efficiency of the compensation data. In some embodiments, the initial sub lookup table includes a column of first indices, and each first index in the initial sub lookup table is mapped to a respective set of binary codes in the variable-length coding table. In some embodiments, code stream determining unit 416 maps each IBL value in the respective unit to the first index that has identical value, maps the first index to the respective set of binary codes, and determines/forms a respective element in the initial code stream to be identical to the set of binary codes. In some embodiments, the initial sub lookup table includes a column of second indices each mapped to a respective first index, and the first indices are mapped to the binary codes through the second indices. For example, each first index is mapped to a respective second index, which is further mapped to a respective set of binary codes.

As described earlier, unit 519 may include at least one row/column of IBL values. For ease of illustration, the formation of an initial code stream from one row of IBL values, e.g., K IBL values (IBL11, IBL12, IBL13, . . . ) is illustrated in FIG. 5J in detail. For ease of illustration, unit 519 is depicted to have one row of IBL values, and can be represented by row 518. As shown in FIG. 5J, an initial sub lookup table 532 may include a column of first indices (IBL0, IBL1, IBL2, . . . ) arranged in the same order as in table 526. In some embodiments, initial sub lookup table 532 also includes a column of second indices (IIBL0, IIBL1, IIBL2, . . . ) arranged in the same order as in table 526. Each second index is mapped to a respective first index (e.g., of the same row in table 526). A variable-length coding table 530 may include a plurality of sets of binary codes (0, 10, 1110, . . . ), each including one or more bits and mapped to a respective first index. In some embodiments, when initial sub lookup table 532 does not include the column of second indices, each first index is directly mapped to the respective set of binary codes. In some embodiments, when initial sub lookup table 532 includes the column of second indices, each first index is mapped to the respective set of binary codes through the respective second index. As shown in FIG. 5J, first index IBL0 may be mapped to binary code "0" through second IIBL0 (or directly, not shown), first index IBL1 may be mapped to binary code "10" through second IIBL1 (or directly), first index IBL2 may be mapped to binary code "110" through second IIBL2 (or directly), . . . . In some embodiments, code stream determining unit 416 locates the first index (IBL0, IBL1, IBL2, . . . ) in initial sub lookup table 532 that has identical value as an IBL value (IBL11, IBL12, IBL13, . . . ) in unit 519, maps the IBL value to the first index, and maps the first index value to the respective set of binary codes value in variable-length coding table 530. Code stream determining unit 416 may further determine the respective element in initial code stream 528 to be the mapped set of binary codes. Each element of initial code stream 528 may include one or more bits. IBL values in unit 519 may be processed sequentially or in parallel, and the set of binary codes corresponding to each IBL value in unit 519 may be determined. In some embodiments, unit 519 includes K IBL values and initial code stream 528 includes K sets of binary codes. The arrangement of the K sets of binary codes may correspond to the arrangement of the K IBL values. For example, in initial code stream 528, binary code "0" (i.e., corresponding to IBL11) is arranged as the first element, binary code "10" (i.e., corresponding to IBL12) is arranged as the second element, binary code "110" (i.e., corresponding to IBL13) is arranged as the third element, . . . , and so on.

Code stream determining unit 416 may determine the stream size (e.g., length) of initial code stream 528. In some embodiments, the stream size of initial code stream 528 is calculated as the total number of bits, i.e., "0"s and "1"s, in initial code stream 528. For example, as shown in FIG. 5J, the stream size of initial code stream 528 is calculated as (1+2+3+4+5+6+7+ . . . ). In some embodiments, the stream size of initial code stream 528 is calculated based on unit 519, variable-length coding table 530, and table 526. That is, the stream size of a unit of IBL values may be determined without generating the initial code stream for the unit. For example, from table 526, code stream determining unit 416 may determine the occurrence numbers of first indices in table 526 mapped to (i.e., being identical to) all different (non-repeating) IBL values in unit 519, and determine the sets of binary codes in variable-length coding table 530 mapped to the first indices. The stream size of the initial code stream may be a sum of the number of bits each times the respective occurrence number, where the number of bits are those in all the mapped sets of binary codes. For example, referring back to FIG. 5J, assuming the non-repeating IBL values in unit 518 are IBL11, IBL12, . . . , IBL17, respectfully mapped to IBL0, IBL1, . . . , IBL6, the stream size of initial code stream 528 is then (1×num0+2×num1+3×num2+4×num3+5×num4+6×num5+7×num6). In various embodiments, variable-length coding table 530 may include any suitable coding table that has can be employed to map a source value/symbol to a variable number of bits and should not be limited by the embodiments of the present disclosure.

In some embodiments, unit 519 includes two rows/columns of IBL values. Code stream determining unit 416 may process the two rows/columns sequentially or in parallel, generating an initial code stream for the two rows/columns. For example, for a unit that has 2×K IBL values, an initial code stream of 1×2K elements can be generated. In some embodiments, the bits corresponding to the second row/column of the respective unit are arranged after the bit corresponding to the first row/column.

Code stream determining unit 416 may store the code stream, the stream size, and the index of the sub lookup table for each of the M units, as well as the N initial sub lookup tables and the base lookup table, as the compressed compensation data, in a memory, e.g., memory 116 such as a flash memory. FIG. 5K depicts an exemplary data structure of the compressed compensation data. As shown in FIG. 5K, code stream determining unit may store base lookup table, N initial sub lookup tables, and code stream data of each unit in memory. In some embodiments, the code stream data of each unit (UNIT 0, UNIT 1, UNIT 2, . . . ) respectively includes an index (INDEX 0, INDEX 1, INDEX 2, . . . ), a stream size (SIZE 0, SIZE 1, SIZE 2, . . . ), and the code stream (CODE STREAM 0, CODE STREAM 1, CODE STREAM 2, . . . ). In some embodiments, the index represents the index of sub lookup table corresponding to the unit, the stream size represents the stream size of the code stream of the unit, and the code stream represents the code stream of the unit. In some embodiments, the total size of the M code streams, e.g., stored in the memory, is less than a total size of M units of IBL data.

Figure 4C:
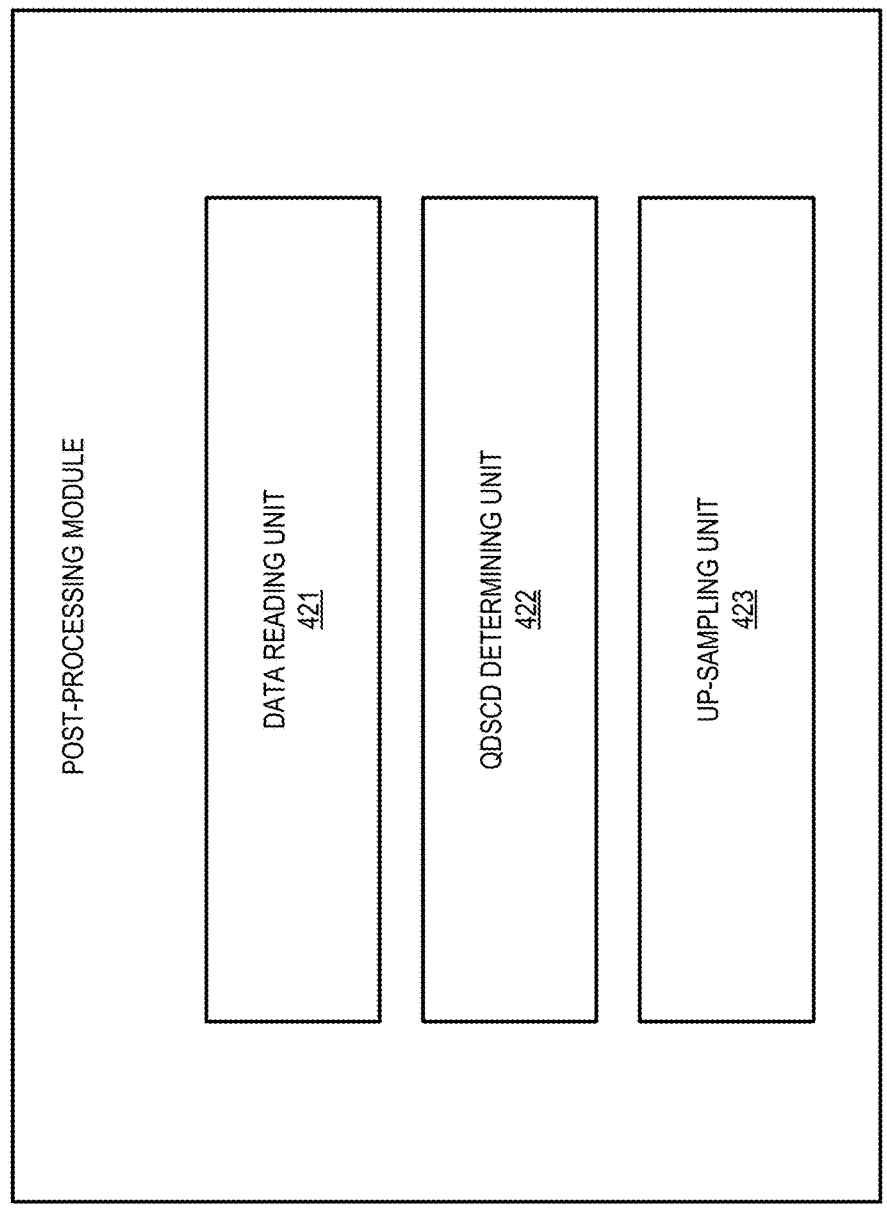
FIG. 4C is a detailed block diagram illustrating one example of a post-processing module in the processor shown in FIG. 4A in accordance with an embodiment.

The decompression of the compressed compensation data may be performed by post-processing module 408 in control logic 104, which may be operatively coupled to pre-processing module 405 in processor 114. FIG. 4C is a detailed block diagram illustrating one example of post-processing module 408 in control logic 104 shown in FIG. 4A in accordance with an embodiment. In this embodiment, post-processing module 408 includes a data reading unit 421, a QDSCD determining unit 422, and an up-sampling unit 423.

Post-processing module 408 may obtain the compressed compensation data from the memory. Data reading unit 421 may perform the operation. In some embodiments, data reading unit 421 sequentially, e.g., in accordance with the sequence the data is stored in the memory, obtains the base lookup table, the N initial sub lookup tables, and the code stream information of the M units.

Post-processing module 408 may determine the IBL values corresponding to each of the M units. QDSCD determining unit 422 may perform the operation. QDSCD determining unit 422 may sequentially read out the code stream data of each of the M units, and decompress the respective code stream data. In some embodiments, for each unit, QDSCD determining unit 422 reads out the index (INDEX 0, INDEX 1, INDEX 2, . . . ) and the stream size (SIZE 0, SIZE 1, SIZE 2, . . . ) mapped to the index. Based on the stream size, QDSCD determining unit 422 determines the code stream (CODE STREAM 0, CODE STREAM 1, CODE STREAM 2, . . . ) mapped to the stream size. In some embodiments, QDSCD determining unit 422 determines the sub lookup table based on the index, and determines the variable-length coding table used for the compression process. For each code stream, QDSCD determining unit 422 may determine the unit of IBL data based on the variable-length coding table and the sub lookup table.

Figure 6A:
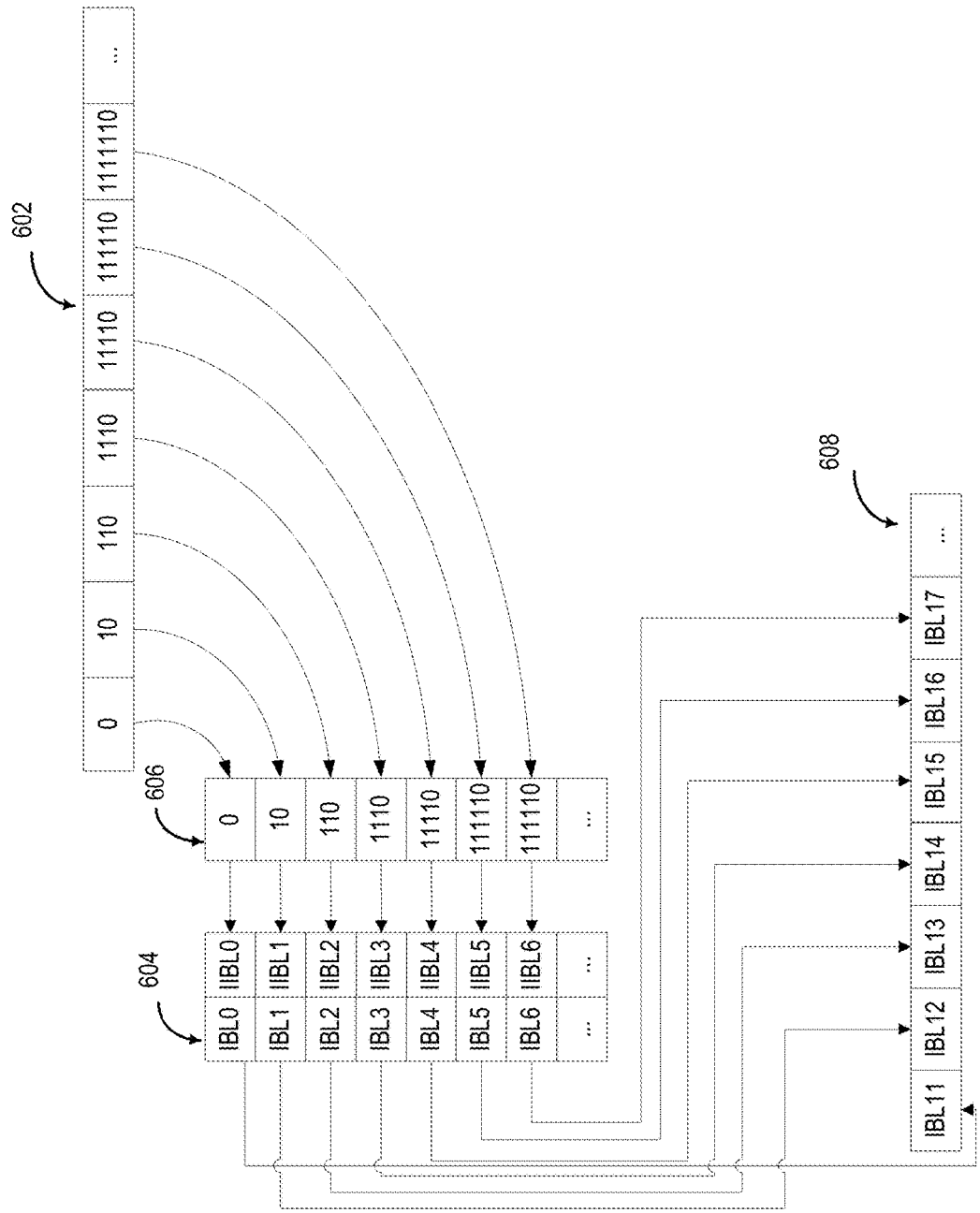
FIG. 6A illustrates an exemplary formation of IBL data in accordance with an embodiment.

FIG. 6A illustrates an exemplary formation of IBL data from a code stream. As shown in FIG. 6A, QDSCD determining unit 422 converts code stream 602 to a unit of IBL data 608 through variable-length coding table 530 and a sub lookup table 604. In some embodiments, for each unit, sub lookup table 604 (for decompression) represents the initial sub lookup table (e.g., 532), retrieved by its index number, used for generating the code stream of the unit. In some embodiments, the conversion illustrated in FIG. 6A is an inverse operation of the conversion illustrated in FIG. 5J. In some embodiments, QDSCD determining unit 422 locates the set of binary codes in variable-length coding table 606 that is identical to each element of code stream 602 and maps each element of code stream 602 to the respective set of binary codes. QDSCD determining unit 422 may map the set of binary codes to the respective first index (IBL0, IBL1, IBL2, . . . ) in sub lookup table 604 based on the same mapping relationship illustrated in the compression process (illustrated in FIG. 5J). QDSCD determining unit 422 may then determine each IBL value (e.g., IBL11, IBL12, . . . ) in unit 608 to have identical value as the respective first index. In some embodiments, the arrangement of the IBL values in unit 608 matches the arrangement of corresponding elements in code stream 602. For example, in unit 608, IBL11 (i.e., corresponding to binary code "0") is arranged as the first element, IBL12 (i.e., corresponding to binary code "10") is arranged as the second element, IBL13 (i.e., corresponding to binary code "110") is arranged as the third element, . . . , and so on. In some embodiments, code stream 602 includes K elements, each element includes a set of binary codes. Accordingly, unit 608 may include 1×K IBL values. In some embodiments, code stream 602 includes 2K elements, and unit 608 may include 2×K IBL values, accordingly.

Sub lookup table 604 may or may not include a column of second indices (IIBL0, IIBL1, IIBL2, . . . ), which are the indices of the first indices (IBL0, IBL1, . . . ), as described previously. When sub lookup table 604 does not include the second indices, sets of binary codes in variable-length coding table 606 may be directly mapped to the corresponding first indices. When sub lookup table 604 includes the second indices, sets of binary codes in variable-length coding table 606 may be mapped to the corresponding first indices through the second indices.

Post-processing module 408 may determine the quantified down-sampled compensation data corresponding to each unit of IBL values. QDSCD determining unit 422 may perform the operation. In some embodiments, for each unit, QDSCD determining unit 422 determines one or more rows of quantified down-sampled compensation data, each piece of which being a quantified down-sampled compensation value corresponding to a respective IBL value in the unit. QDSCD determining unit 422 may obtain the base lookup table from the memory for this operation.

Figure 6B:
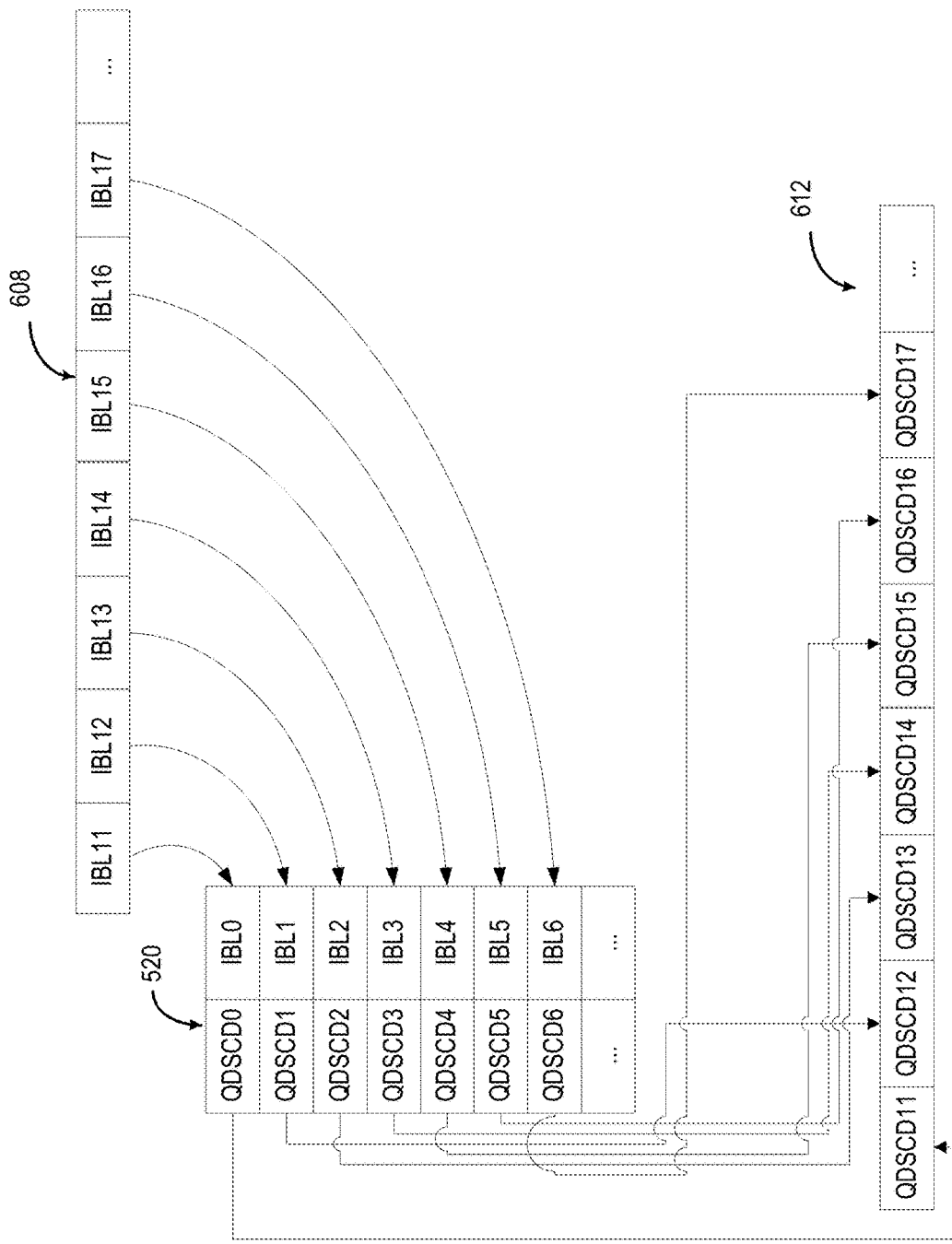
FIG. 6B illustrates an exemplary formation of quantified down-sampled compensation data in accordance with an embodiment.

FIG. 6B illustrates an exemplary formation of a row of quantified down-sampled compensation data from a unit of IBL values. As shown in FIG. 6B, QDSCD determining unit 422 converts each unit 608 of IBL data to a row 612 of quantified down-sampled compensation values through base lookup table 520. In some embodiments, the conversion illustrated in FIG. 6B is an inverse operation of the conversion illustrated in FIG. 5G. In some embodiments, QDSCD determining unit 422 locates the first index (IBL0, IBL1, IBL2, . . . ) in base lookup table 520 that has identical value as each IBL value (IBL11, IBL12, . . . ) in unit 608, and map each IBL value to the respective first index. QDSCD determining unit 422 may determine the quantified value (QDSCD0, QDSCD1, QDSCD2, . . . ) in sub lookup table 604 mapped to each first index based on the same mapping relationship illustrated in the compression process (illustrated in FIG. 5G), and map the first index to the respective quantified value. QDSCD determining unit 422 may then determine each quantified down-sampled compensation value (QDSCD11, QDSCD12, QDSCD13, . . . ) in row 612, having the same arrangement as the corresponding IBL values, to have identical value as the respective quantified value. For example, in row 612, QDSCD11 (i.e., corresponding to IBL11) is arranged as the first element and has the identical value as QDSCD0, QDSCD12 (i.e., corresponding to IBL12) is arranged as the second element and has the identical value as QDSCD1, QDSCD13 (i.e., corresponding to iB113) is arranged as the third element and has the identical value as QDSCD2, . . . . In some embodiments, unit 608 includes 1×K IBL values. Accordingly, row 612 may include 1×K quantified down-sampled compensation values. In some embodiments, unit 608 includes 2×K IBL values. Accordingly, row 612 may include 2×K IBL quantified down-sampled compensation values. In some embodiments, the M units of IBL values are converted to an array of J×K quantified down-sampled compensation values.

Figure 6C:
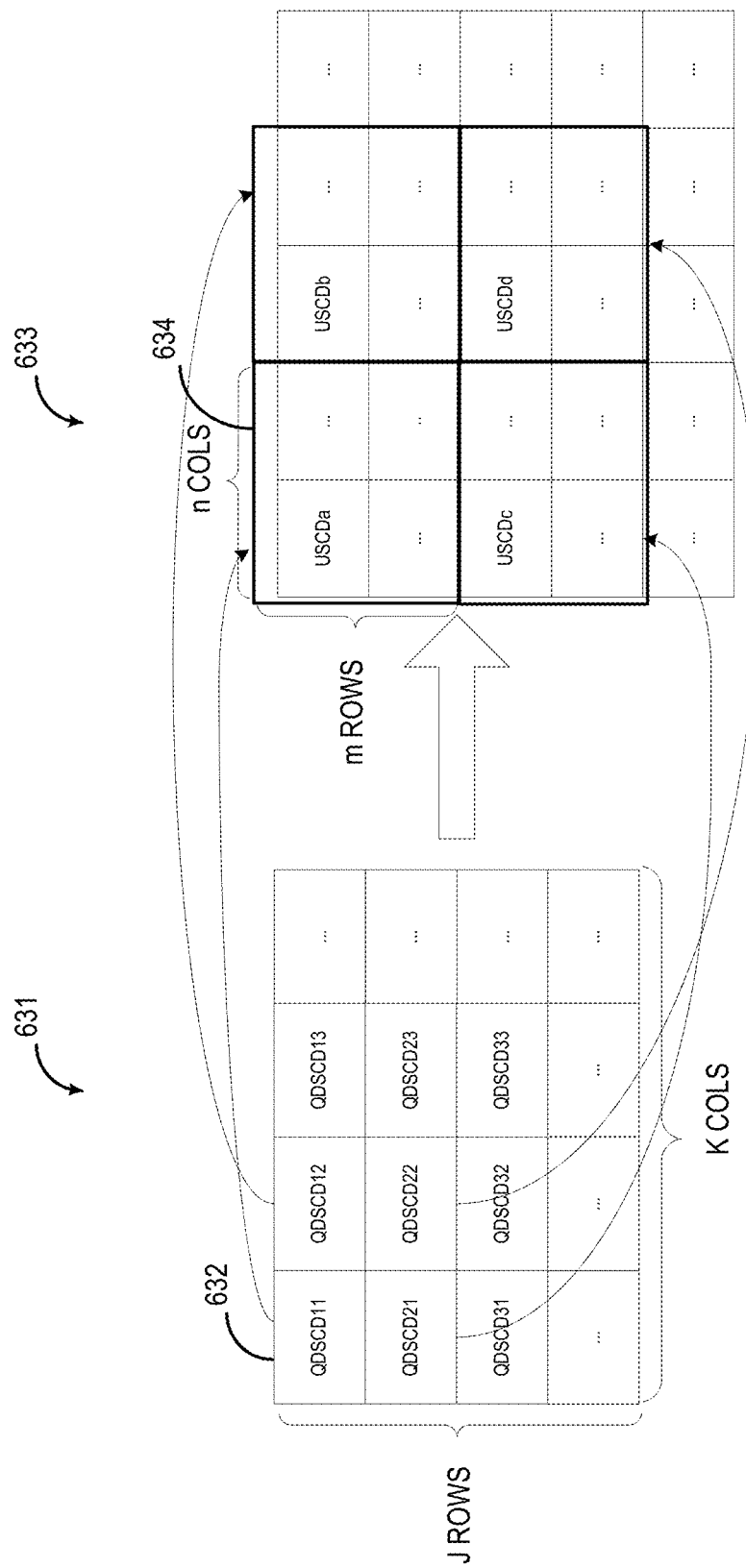
FIG. 6C illustrates an exemplary up-sampling operation on a display panel in accordance with an embodiment.

Post-processing module 408 may then up-sample each quantified down-sampled compensation values to form the decompressed compensation data. Up-sampling unit 423 may perform the operation. FIG. 6C illustrates an exemplary up-sampling operation. As shown in FIG. 6C, up-sampling unit 423 may upscale each quantified down-sampled compensation value 632 (e.g., QDSCD11, QDSCD12, QDSCD21, QDSCD22, . . . ) in an array 631 of J×K quantified down-sampled compensation values by a respective block size. An array 633 of up-sampled data, including (mJ)×(nK) compensation values, may be formed. In some embodiments, array 633 may be used to compensate pixel data of display panel 210. In some embodiments, the block size may be the same for each quantified down-sampled compensation value 632 and may be m×n, which is previously determined in the down-sampling process illustrated in FIG. 5A. That is, for each quantified down-sampled compensation value 632, a block 634 of m×n up-sampled compensation values is formed. Up-sampling unit 423 may determine the m×n up-sampled compensation values based on the corresponding quantified down-sampled compensation value 632. The m×n up-sampled compensation values may be determined using any suitable up-sampling methods such as an even-value up-sampling method and/or an interpolation up-sampling method. In some embodiments, by using the even-value up-sampling method, each up-sampled compensation value in block 634 may be identical to the corresponding quantified down-sampled compensation value. For example, USCDa=QDSCD11, USCDb=QDSCD12, USCDc=QDSCD21, USCDd=QDSCD22, . . . , and so on. In some embodiments, by using the interpolation up-sampling method, each up-sampled compensation value in block 634 may be determined to be linearly proportional to the distance between respective the quantified down-sampled compensation value and the quantified down-sampled compensation value of an adjacent block 634.

In some embodiments, post-processing module 408 includes a control signal generating unit (not shown) for generating control signals for display 102. In some embodiments, the control signal generating unit includes a timing controller (TCON) and a clock signal generator. The TCON may provide a variety of enable signals to drivers 409 of display 102. The clock signal generator may provide a variety of clock signals to drivers 409 of display 102. As described above, control signals 108, including the enable signals and clock signals, can control gate scanning driver 304 to scan corresponding rows of pixels according to a gate scanning order and control source writing driver 306 to write each set of display data according to the order of pieces of display data in the set of display data. In other words, control signals 108 can cause the pixels in display panel 210 to be refreshed following a certain order at a certain rate. As described below in detail, the order and rate of refreshing the pixels in the first and second portions of display panel 210 may be determined by controlling the signal generating unit based on the frame rate at which the corresponding set of display data is received by control logic 104.

Returning back to FIG. 4A, data transmitter 406 in this embodiment is operatively coupled to pre-processing module 405 and configured to transmit stream of display data 106 in each frame to control logic 104 through memory 116. Stream of display data 106 may include original display data of an image and compensation data (e.g., compressed compensation data) to be applied to corresponding pixels in each frame. For example, in each frame, a sub-set of original display data (e.g., for displaying a sub-image) and one or more compensation values may be transmitted as display data 106. In one example, in a frame, display data 106 may also include compensation data that is compressed and stored into memory 116 before being transmitted into control logic 104. Memory 116 may include any suitable storage device for caching, buffering, and/or storing display data 106 between processor 114 and control logic 104. In some embodiments, no memory 116 is coupled between processor 114 and control logic 104. That is, display data 106, e.g., including pixel data and compressed compensation data, can be transmitted from processor 114 to control logic 104 without any buffering or storage.

Data transmitter 406 may be any suitable display interface between processor 114 and control logic 104, such as but not limited to, display serial interface (DSI), display pixel interface (DPI), and display bus interface (DBI) by the Mobile Industry Processor Interface (MIPI) Alliance, unified display interface (UDI), digital visual interface (DVI), high-definition multimedia interface (HDMI), and DisplayPort (DP). Based on the specific interface standard adopted by data transmitter 406, stream of display data 106 may be transmitted in series in the corresponding data format along with any suitable timing signals, such as vertical synchronization (V-Sync), horizontal synchronization (H-Sync), vertical back porch (VBP), horizontal back porch (HBP), vertical front porch (VFP), and horizontal front porch (HVP), which are used to organize and synchronize stream of display data 106 in each frame with the array of pixels on display panel 210. In some embodiments, data receiver 407 may receive any original display data and compensation data (e.g., compressed compensation data) from data transmitter 406 or memory 116, and output the received data to post-processing module 408, e.g., for data decompression.

In some embodiments, control logic 104 and display 102 are part of an apparatus, e.g., a smart phone or a tablet, and processor 114 is part of a computer external of the apparatus (i.e., external of control logic 104). For example, processor 114 may be part of a computer employed for generating and compressing the compensation data for the apparatus. In some embodiments, data transmission between processor 114 and control logic 104 is through memory 116, which is a storage device such as a flash memory for storing compressed compensation data by processor 114. In some embodiments, processor 114 generates and compresses the compensation data, and stores the compressed compensation data in memory 116 (e.g., flash memory). Memory 116 may be coupled to control logic 104 such that the compressed compensation data is inputted into control logic 104 to be decompressed. In this case, no pixel data is stored in the flash memory. Control logic 104 further decompresses the compressed compensation data and generates control signals 108 based on the compensation data.

Figure 7A:
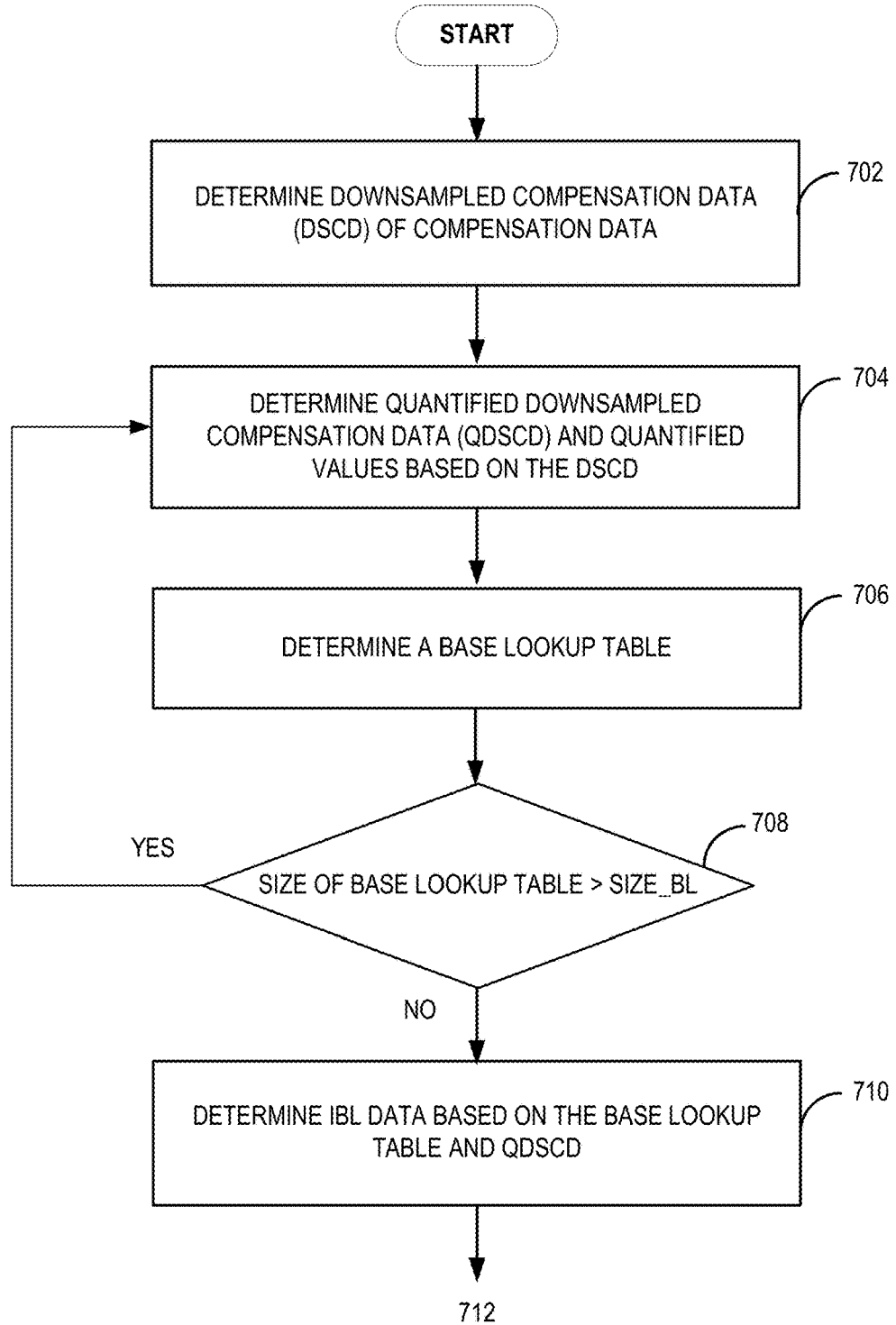
FIGS. 7A and 7B illustrate a flow chart of a method for compressing compensation data in a display panel in accordance with an embodiment.
Figure 7B:
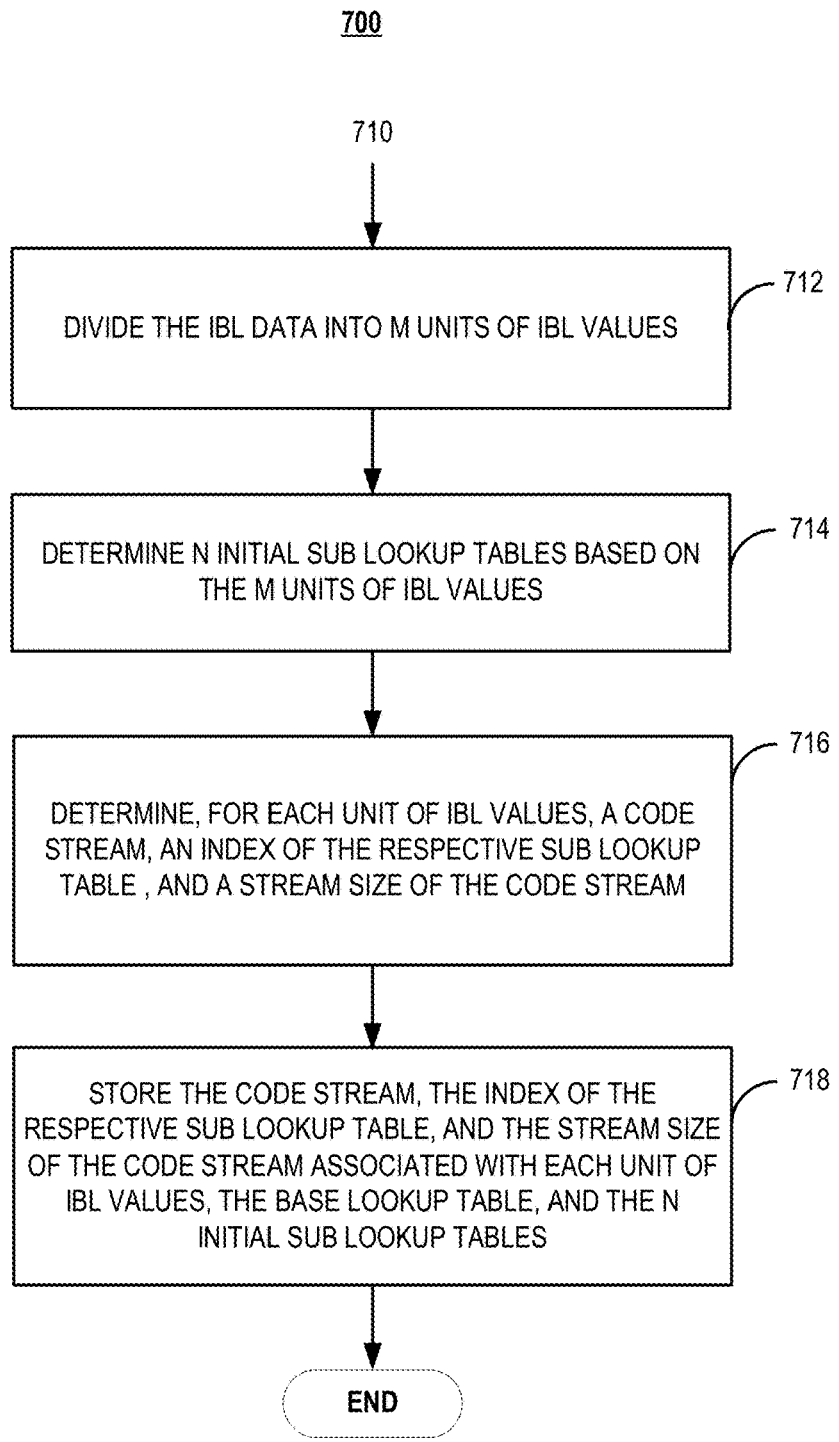

FIGS. 7A and 7B illustrate a flow chart of a method 700 for compressing compensation data in accordance with an embodiment. FIG. 7B is a continuation of FIG. 7A. It will be described with reference to the above figures, such as FIGS. 5A-5K. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. In some embodiments, each operation of method 700 may be performed by pre-processing module 405.

Starting at 702, a plurality of pieces of compensation data may be down-sampled to form a plurality of pieces of down-sampled compensation data (DSCD). At 704, a plurality of quantified values may be determined based on the down-sampled compensation data, and the down-sampled compensation data may be quantified based on the quantified values to form a plurality of pieces of quantified down-sampled compensation data (QDSCD). A plurality of quantified values may be generated based on the down-sampled compensation data and may be used to form the quantified down-sampled compensation data. At 706, a base lookup table may be determined based on the quantified down-sampled compensation data and the quantified values. In some embodiments, the base lookup table includes the quantified values sorted and arranged in an descending order of the occurrence numbers of the quantified values. At 708, it may be determined whether the size of the base lookup table is greater than a predetermined size limit (Size_BL). If yes, the method proceeds to 704, in which a step size of the quantification is increased to reduce the size of the base lookup table. If no, the method proceeds to 710, in which the quantified down-sampled compensation data may be converted to an array of IBL data based on the base lookup table. At 712, the IBL data may be divided into M units of IBL values. In some embodiments, each unit includes one or more rows/columns of IBL values. At 714, M initial sub lookup tables may be determined and sorted based on the occurrence numbers of the M initial sub lookup tables, and N with the highest occurrence numbers may be selected. At 716, each unit of IBL values may be converted to a code stream based on a variable-length coding table and N initial sub lookup tables. A sub lookup table, an index of the sub lookup table, and a stream size of the code stream may be determined. The code stream may correspond to the initial code stream with the shortest stream size amongst the N initial code streams generated based on the unit of IBL values and N initial sub lookup tables. The sub lookup table may be the initial sub lookup table employed to generate the code stream. The index may be the index of the initial sub lookup table employed to generate the code stream. At 718, the base lookup table, the N initial sub lookup tables, and code stream information of each unit may be stored. The code stream information of each unit may include the code stream, the sub lookup table, the index of the sub lookup table, and the stream size of the code stream.

Figure 8:
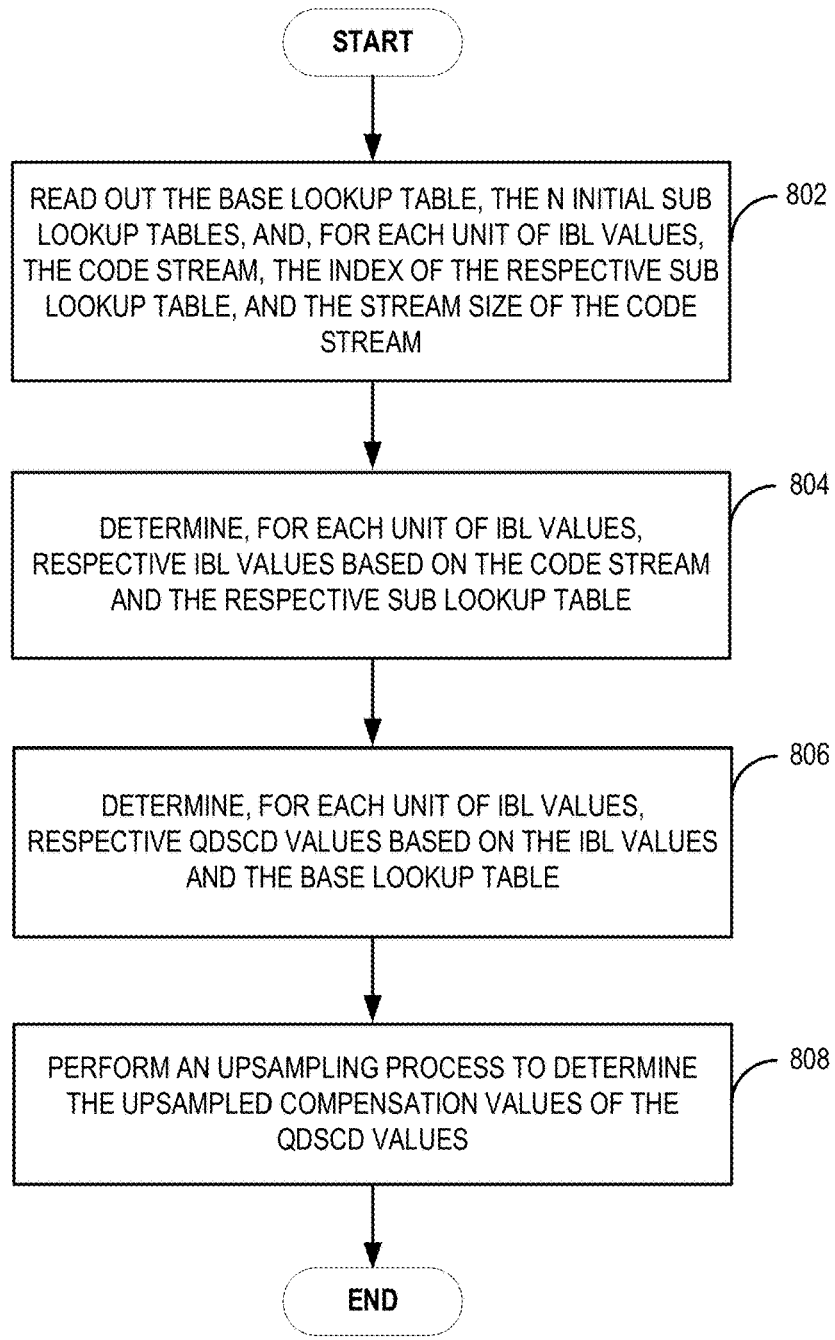
FIG. 8 illustrates a flow chart of a method for decompressing compensation data in a display panel in accordance with an embodiment.

FIG. 8 is a flow chart method 800 for decompressing the compressed compensation data, in accordance with an embodiment. It will be described with reference to the above figures, such as FIGS. 6A-6C. However, any suitable circuit, logic, unit, or module may be employed. The method can be performed by any suitable circuit, logic, unit, or module that can comprise hardware (e.g., circuitry, dedicated logic, programmable logic, microcode, etc.), software (e.g., instructions executing on a processing device), firmware, or a combination thereof. It is to be appreciated that not all steps may be needed to perform the disclosure provided herein. Further, some of the steps may be performed simultaneously, or in a different order than shown in FIG. 8, as will be understood by a person of ordinary skill in the art. In some embodiments, each operation of method 800 may be performed by post-processing module 408.

Starting at 802, the base lookup table, the N initial sub lookup tables, and code stream information of each unit may be read out. The code stream information of each unit may include the code stream, the sub lookup table, the index of the sub lookup table, and the stream size of the code stream. At 804, the code stream of each unit may be converted to corresponding IBL values based on the code stream, the sub lookup table, and the variable-length coding table used in the compression process (e.g., 716). At 806, IBL values of each unit may be converted to at least one row of quantified down-sampled compensation values based on the IBL values and the base lookup table. At 808, the quantified down-sampled compensation values may be up-sampled to form the decompressed compensation data.

The above detailed description of the disclosure and the examples described therein have been presented for the purposes of illustration and description only and not by limitation. It is therefore contemplated that the present disclosure cover any and all modifications, variations or equivalents that fall within the spirit and scope of the basic underlying principles disclosed above and claimed herein.

What is claimed is:

1. A system for display, comprising:
   a display having a plurality of pixels;
   a processor, comprising:
      a graphics pipeline configured to generate a plurality of pieces of pixel data for the plurality of pixels,
      a pre-processing module configured to generate a plurality of pieces of compensation data for the pixel data and compress the compensation data by
      determining a plurality of pieces of quantified down-sampled compensation data based on the compensation data, a size of the quantified down-sampled compensation data being less than a size of the compensation data,
      converting the quantified down-sampled compensation data into M units of index data, M being a positive integer greater than 1 and less than the size of the quantified down-sampled compensation data,
      converting the M units of index data into M code streams, and control logic operatively coupled to the display and the processor, comprising:
      a post-processing module configured to decompress the compressed compensation data based on the M code streams to provide control signals for driving the display.

2. The system of claim 1, wherein a range of index data is less than a range of the quantified down-sampled compensation data and a total size of the M units of index data is less than a size of the quantified down-sampled compensation data.

3. The system of claim 2, wherein a total size of M code streams is less than the size of the M units of index data.

4. The system of claim 1, wherein, to determine the plurality of pieces of quantified down-sampled compensation data, the pre-processing module is configured to:
   down-sample the compensation data to determine a plurality of pieces of down-sampled compensation data; and
   quantify the down-sampled compensation data to determine the plurality of pieces of quantified down-sampled compensation data.

5. The system of claim 4, wherein to down-sample the compensation data, the pre-processing module is configured to:
   divide an array of the compensation data into a plurality of blocks, each block comprising more than one piece of compensation data; and
   determine a piece of down-sampled compensation data for each block.

6. The system of claim 5, wherein, to determine the piece of down-sampled compensation data for each block, the pre-processing module is configured to perform at least one of an average down-sampling, a median down-sampling, a max down-sampling, a min down-sampling, a position-specified down-sampling, or a gradient down-sampling.

7. The system of claim 5, wherein
   each of the plurality of blocks has a block size of m×n pieces of compensation data, m being a positive integer greater than 1 and less than a number of rows in the array of the compensation data, and n being a positive integer greater than 1 and less than a number of columns in the array of the compensation data; and
   the plurality of pieces of down-sampled compensation data are arranged in a J×K array, J being equal to the number of rows divided by m, and K being equal to the number of columns being divided by n.

8. The system of claim 7, wherein, to quantify the down-sampled compensation data, the pre-processing module is configured to:
   determine a plurality of pieces of non-repeating down-sampled compensation data; and
   sort the plurality of pieces of the non-repeating down-sampled compensation data in an order.

9. The system of claim 8, wherein the order comprises an ascending order of the plurality of pieces of the non-repeating down-sampled compensation data.

10. The system of claim 8, wherein the pre-processing module is further configured to determine an occurrence number for each of the plurality of pieces of the non-repeating down-sampled compensation data.

11. The system of claim 10, wherein, to quantify the down-sampled compensation data, the pre-processing module is further configured to determine a plurality of quantified values, each corresponding to a plurality of adjacent pieces of the non-repeating down-sampled compensation data in the order.

12. The system of claim 11, wherein the pre-processing module determines each of the quantified values based on at least one of a maximum value, a minimum value, a median value, or a range-defined value, of the plurality of adjacent pieces of the non-repeating down-sampled compensation data.

13. The system of claim 12, wherein the pre-processing module determines the range-defined value of the plurality of adjacent pieces of the non-repeating down-sampled compensation data by:
   determining a plurality of ranges, each of the ranges comprising the respective plurality of adjacent pieces of the non-repeating down-sampled compensation data; and
   determining, for each of the ranges, the respective quantified value for the respective plurality of adjacent pieces of the non-repeating down-sampled compensation data.

14. The system of claim 13, wherein the plurality of ranges are determined based on a distribution of the plurality of pieces of non-repeating down-sampled compensation data in the order.

15. The system of claim 11, wherein the pre-processing module is further configured to:
   form a J×K array of the quantified down-sampled compensation data by substituting each of the plurality of pieces of down-sampled compensation data with the respective quantified value.

16. The system of claim 15, wherein, to convert the quantified down-sampled compensation data into the M units of index data, the pre-processing module is further configured to:

sort the plurality of quantified values in an order of descending respective occurrence numbers of the plurality of quantified values in the J×K array of quantified down-sampled compensation data;

determine a plurality of first indices, each mapped to a respective one of the plurality of sorted quantified values; and determine a first lookup table that comprises the first indices and the sorted quantified values.

17. A method for compressing and decompressing compensation data for a display, comprising:

generating a plurality of pieces of compensation data for pixel data of the display;

compressing the compensation data by:

determining a plurality of pieces of quantified down-sampled compensation data based on the compensation data, a size of the quantified down-sampled compensation data being less than a size of the compensation data;

converting the quantified down-sampled compensation data into M units of index data, M being a positive integer greater than 1 and less than the size of the quantified down-sampled compensation data; and converting the M units of index data into M code streams; and decompressing the compressed compensation data based on the M code streams to provide control signals for driving the display.

18. The method of claim 17, wherein determining the plurality of pieces of quantified down-sampled compensation data comprises:

down-sampling the compensation data to determine a plurality of pieces of down-sampled compensation data; and quantifying the down-sampled compensation data to determine the plurality of pieces of quantified down-sampled compensation data.

19. The method of claim 18, wherein quantifying the down-sampled compensation data comprises:

determining a plurality of pieces of non-repeating down-sampled compensation data; and sorting the plurality of pieces of the non-repeating down-sampled compensation data in an order; and determining an occurrence number for each of the plurality of pieces of the non-repeating down-sampled compensation data.

20. A non-transitory computer-readable medium that stores a set of instructions, when executed by at least one processor, causes the at least one processor to determine a method for compressing and decompressing compensation data for a display, the method comprising:

generating a plurality of pieces of compensation data for pixel data of the display;

compressing the compensation data by:

determining a plurality of pieces of quantified down-sampled compensation data based on the compensation data, a size of the quantified down-sampled compensation data being less than a size of the compensation data;

converting the quantified down-sampled compensation data into M units of index data, M being a positive integer greater than 1 and less than the size of the quantified down-sampled compensation data; and converting the M units of index data into M code streams; and decompressing the compressed compensation data based on the M code streams to provide control signals for driving the display.

\* \* \* \* \*